United States Patent
Sumitomo et al.

(10) Patent No.: US 7,305,106 B2
(45) Date of Patent: Dec. 4, 2007

(54) OBJECT DETECTION APPARATUS, OBJECT DETECTION METHOD AND RECORDING MEDIUM

(75) Inventors: Hironori Sumitomo, Nishinomiya (JP); Daisaku Horie, Uji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 725 days.

(21) Appl. No.: 10/777,363

(22) Filed: Feb. 12, 2004

(65) Prior Publication Data
US 2005/0105770 A1 May 19, 2005

(30) Foreign Application Priority Data
Nov. 14, 2003 (JP) .............................. 2003-385846

(51) Int. Cl.
*G06K 9/48* (2006.01)
*G06K 9/62* (2006.01)

(52) U.S. Cl. .................. 382/103; 382/199; 382/217
(58) Field of Classification Search ............... 382/103, 382/199, 209, 217, 220
See application file for complete search history.

(56) References Cited

U.S. PATENT DOCUMENTS

| | | | | |
|---|---|---|---|---|
| 5,280,530 A * | 1/1994 | Trew et al. | ........... | 382/103 |
| 5,835,616 A * | 11/1998 | Lobo et al. | ........... | 382/118 |
| 5,852,669 A | 12/1998 | Eleftheriadis et al. | ...... | 382/118 |
| 5,987,154 A * | 11/1999 | Gibbon et al. | ........... | 382/115 |
| 5,995,639 A * | 11/1999 | Kado et al. | ........... | 382/118 |
| 6,665,446 B1 * | 12/2003 | Kato | ........... | 382/251 |
| 6,879,705 B1 * | 4/2005 | Tao et al. | ........... | 382/103 |
| 6,885,761 B2 * | 4/2005 | Kage | ........... | 382/118 |
| 6,922,478 B1 * | 7/2005 | Konen et al. | ........... | 382/115 |
| 6,967,674 B1 * | 11/2005 | Lausch | ........... | 348/143 |
| 7,072,526 B2 * | 7/2006 | Sakuramoto | ........... | 382/282 |
| 7,123,745 B1 * | 10/2006 | Lee | ........... | 382/103 |
| 7,123,754 B2 * | 10/2006 | Matsuo et al. | ........... | 382/118 |
| 2002/0071598 A1 * | 6/2002 | Kunieda et al. | ........... | 382/125 |
| 2003/0103648 A1 * | 6/2003 | Ito et al. | ........... | 382/103 |

(Continued)

FOREIGN PATENT DOCUMENTS

JP 9-035069 A 2/1997

(Continued)

OTHER PUBLICATIONS

Japanese "Notification of Reasons for Refusal" dated Dec. 12, 2006 for counterpart JP Application No. 2003-385846; together with a translation.

(Continued)

*Primary Examiner*—Andrew W. Johns
*Assistant Examiner*—Anthony Mackowey
(74) *Attorney, Agent, or Firm*—Sidley Austin LLP

(57) ABSTRACT

An object detection apparatus is provided that detects a target object in an image more securely and at higher speed than the conventional one. The human body detection apparatus for detecting a target object in an image includes a template memory portion for memorizing a template consisting of one or more open curves indicating a part of a contour of a human model, an image data reception portion for entering an image to be detected, a head position detection portion for detecting a human body in the image by performing a matching process on the entered image using the template.

17 Claims, 26 Drawing Sheets

U.S. PATENT DOCUMENTS

| | | | |
|---|---|---|---|
| 2003/0194133 A1* | 10/2003 | Wenzel et al. | 382/209 |
| 2003/0194134 A1* | 10/2003 | Wenzel et al. | 382/209 |
| 2003/0194144 A1* | 10/2003 | Wenzel et al. | 382/242 |
| 2003/0235341 A1* | 12/2003 | Gokturk et al. | 382/243 |
| 2004/0037467 A1* | 2/2004 | Wenzel et al. | 382/203 |
| 2004/0120399 A1* | 6/2004 | Kato | 375/240.11 |
| 2004/0151347 A1* | 8/2004 | Wisniewski | 382/115 |
| 2005/0036688 A1* | 2/2005 | Froeba et al. | 382/199 |

FOREIGN PATENT DOCUMENTS

| | | |
|---|---|---|
| JP | 2000-082146 | 3/2000 |
| JP | 2001-175868 A | 6/2001 |
| JP | 2001-222719 A | 8/2001 |
| JP | 2005-025568 | 1/2005 |

OTHER PUBLICATIONS

Japanese "Notification of Reasons for Refusal" dated Apr. 10, 2007 for counterpart JP Application No. 2003-385846; together with a translation.

* cited by examiner

ENLARGED IMAGE

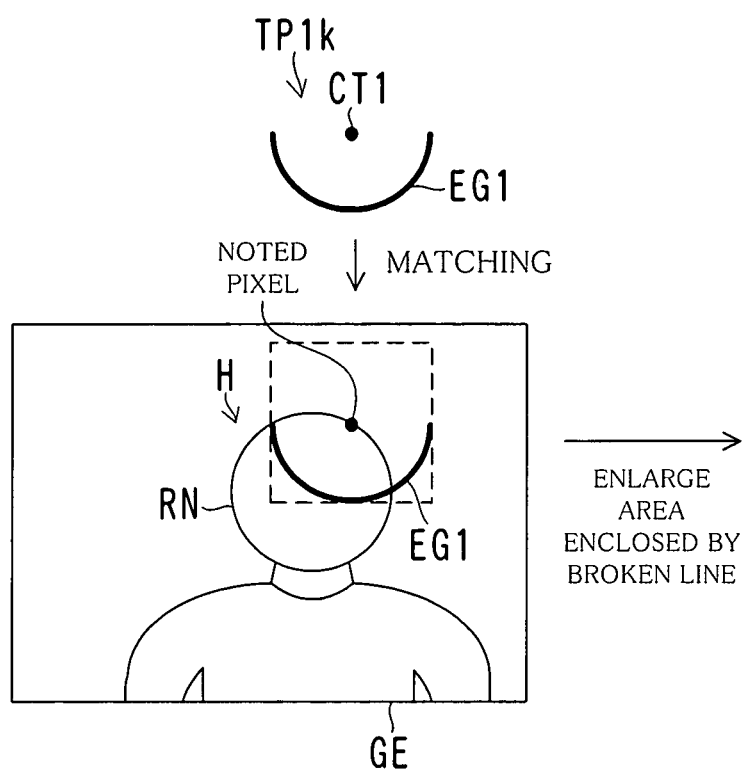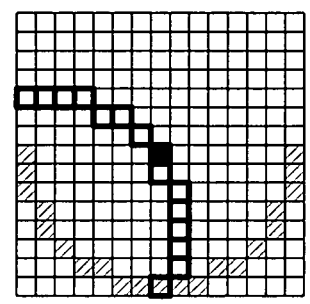
FIG. 20A
FIG. 20B

↓ VOTE

↓ VOTE RESULT

G

↓

BRIGHTNESS
IMAGE

G

↓

BRIGHTNESS IMAGE
(BACKGROUND REFERENCE
IMAGE GH)

BACKGROUND
DIFFERENTIAL

↓  ↓

GZ

OBJECT DETECTION APPARATUS, OBJECT DETECTION METHOD AND RECORDING MEDIUM

This application is based on Japanese Patent Application No. 2003-385846 filed on Nov. 14, 2003, the contents of which are hereby incorporated by reference.

BACKGROUND OF THE INVENTION

1. Field of the Invention

The present invention relates to an object detection apparatus and an object detection method for detecting a target object in an image.

2. Description of the Prior Art

Conventionally, various methods have been proposed for detecting a target object in an image. For example, as a method for detecting a human head in an image, some methods are proposed as described in Japanese unexamined patent publications No. 2001-222719, No. 9-35069 and No. 2001-175868.

According to the method described in Japanese unexamined patent publication No. 2001-222719, a human head is regarded as an elliptical shape, and the human head (i.e., the elliptical shape) is detected in an image by a vote process that is one type of Hough transformation (hereinafter, it may be referred to as "Hough transformation method") using an elliptical template.

According to the method described in Japanese unexamined patent publication No. 9-35069, a template that lay emphasis on a part of the elliptical shape is used for detecting the head (the elliptical shape) in an image. By using this template, the head (the elliptical shape) can be detected even if an occlusion is generated in a part of the head to be detected.

According to the method described in Japanese unexamined patent publication No. 2001-175868, directional properties of edges at plural points on the contour of the human body are calculated as characteristic quantities, and the human body is detected by evaluating the characteristic quantities in a comprehensive manner.

However, the method described in Japanese unexamined patent publication No. 2001-222719 has a disadvantage that if an occlusion is generated in a part of the head to be detected, the head may not be detected effectively. In other words, the accuracy of detection may be deteriorated in such a case.

The method described in Japanese unexamined patent publication No. 9-35069 can detect the head even if the above-mentioned occlusion is generated but has a disadvantage that the template is complicated so that the process requires much time.

The method described in Japanese unexamined patent publication No. 2001-175868 has a disadvantage that plural edges indicating different directional properties are necessary so that the process requires much time.

SUMMARY OF THE INVENTION

An object of the present invention is to detect a target object in an image more reliably and at higher speed than the conventional method.

An object detection apparatus according to the present invention is an apparatus for detecting a target object in an image. The apparatus includes a template memory portion for memorizing a template consisting of one or more open curves indicating a part of a contour of the object model or a part of the model, an image input portion for entering an image to be detected, and a detection portion for detecting the object in the entered image by calculating a matching degree of the entered image with a fixed shape by the template.

Alternatively, the apparatus includes an edge image generation portion for generating an edge image of the entered image, and a detection portion for detecting the object in accordance with the number of pixels in an overlapping area of an edge of the edge image with the one or more open curves of the template when overlapping each position of the generated edge image with the template.

Alternatively, using a template that is made of one or more open curves indicating a part of a contour of the object model or a part of the object model and a point indicating a predetermined position of the model and is formed by rotating the one or more open curves around the point by a half-turn, the object is detected by the Hough transformation method.

It is preferable to use the fixed shape of a part as the template, which has a symbolic shape and a small size relatively to the entire object and of a part in which a change of a moving shape is small. For example, if the target object to be detected is a passerby, it is preferable to use a template of a contour or a shape of an upper half of a head, a shoulder, a chin, an ear, a leg, an eye, an eyebrow, a nose or a mouth. Otherwise, it is possible to use a template consisting of two lines indicating right and left shoulders or a template consisting of three lines indicating the nose and right and left ears or other template consisting of a plurality of lines. It is preferable that features of the object show up even in the state where an occlusion is generated.

According to the present invention, a target object in an image can be detected more reliably and at higher speed than the conventional method.

BRIEF DESCRIPTION OF THE DRAWINGS

FIGS. 20A and 20B are diagrams explaining a method for matching with the template in the vote process.

DESCRIPTION OF THE PREFERRED EMBODIMENTS

Hereinafter, the present invention will be explained more in detail with reference to embodiments and drawings.

First Embodiment

Figure 1:
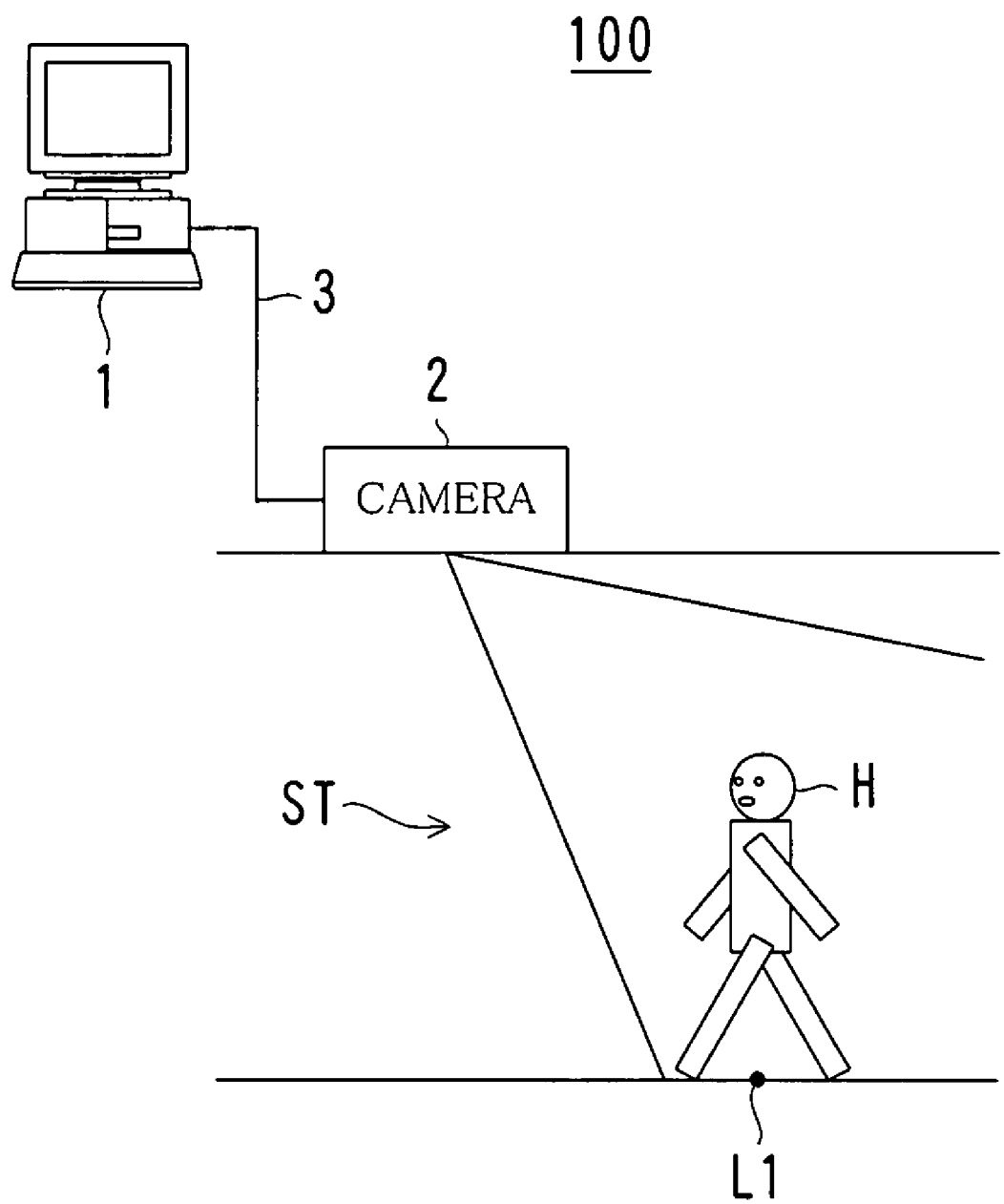
FIG. 1 is a diagram showing an example of a general structure of a monitoring system.
Figure 2:
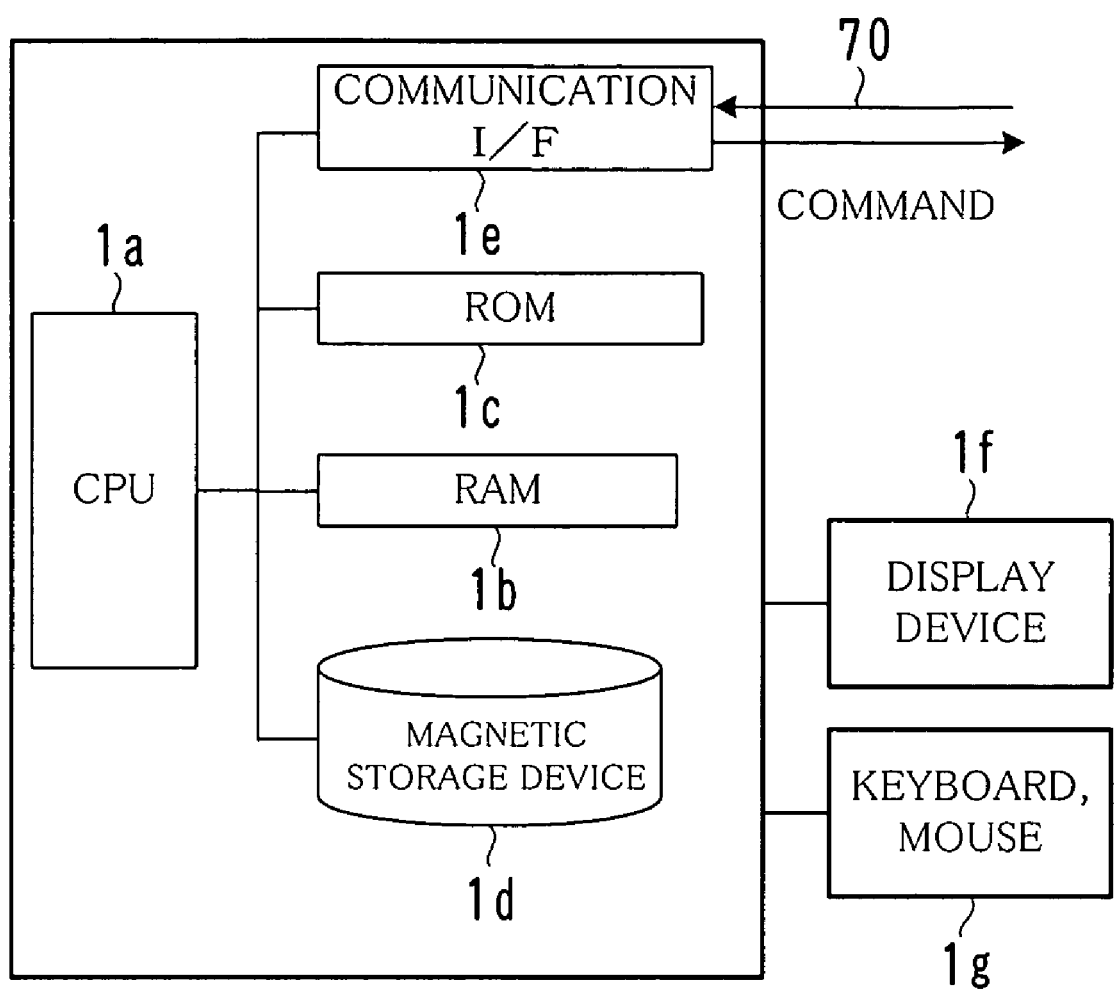
FIG. 2 is a diagram showing an example of a hardware structure of a human body detection apparatus.
Figure 3:
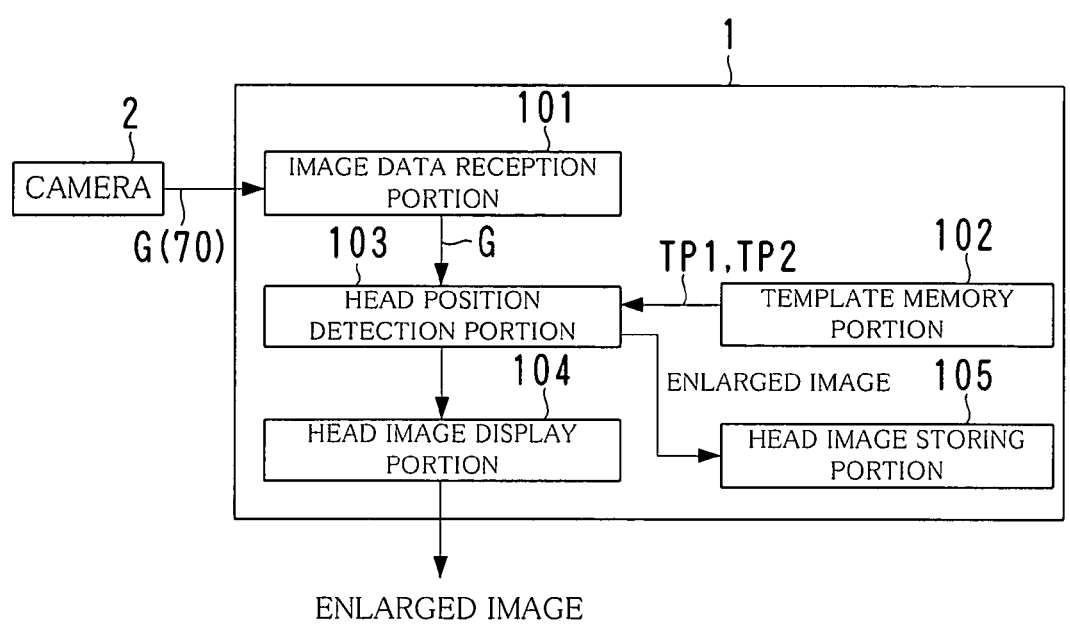
FIG. 3 is a diagram showing an example of a functional structure of the human body detection apparatus.
Figure 4:
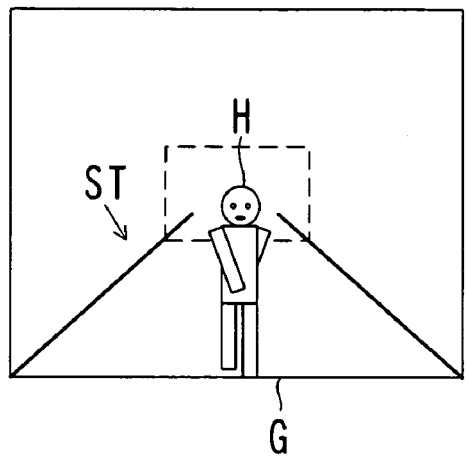
FIG. 4 is a diagram showing an example of an image obtained by using a video camera.
Figure 5A:
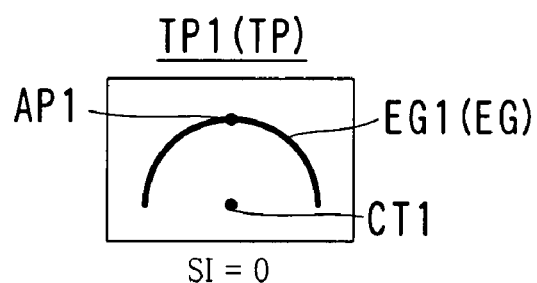
FIGS. 5A and 5B are diagrams showing examples of a template.
Figure 5B:
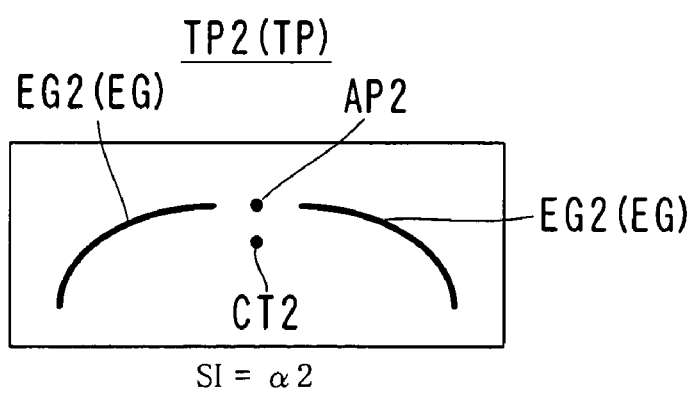
Figure 6A:
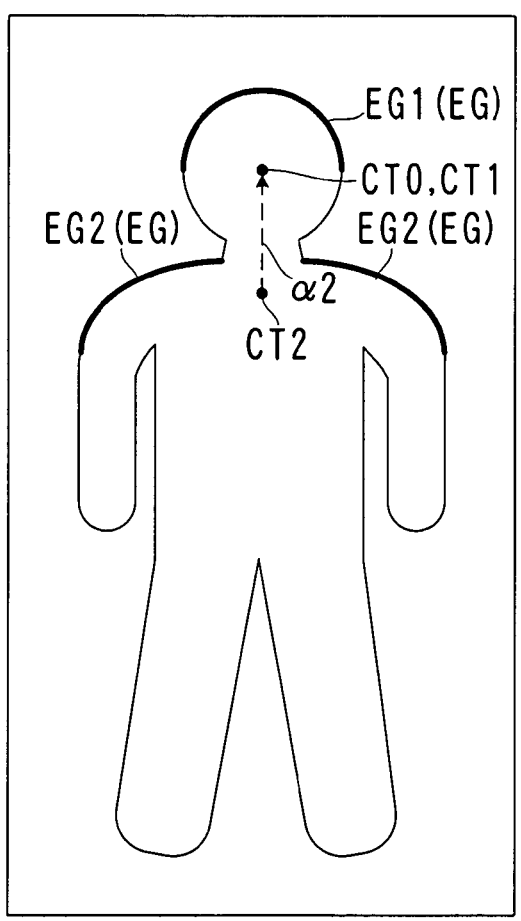
FIGS. 6A-6C are diagrams showing an example of a method for generating the templates.
Figure 6B:
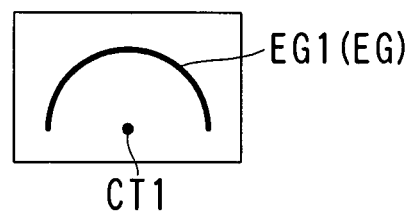
Figure 6C:
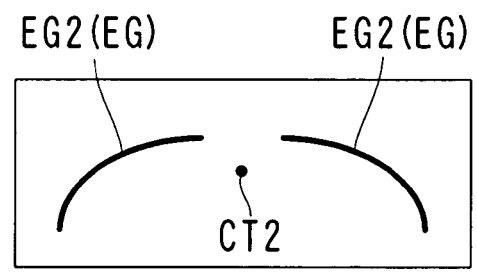
Figure 7:
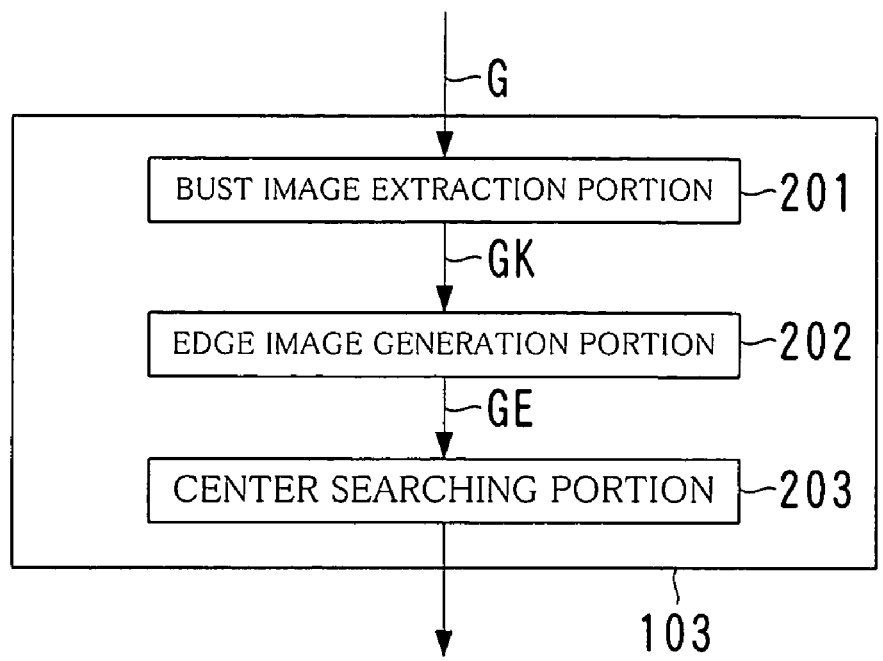
FIG. 7 is a diagram showing an example of a structure of a head position detection portion.
Figure 8:
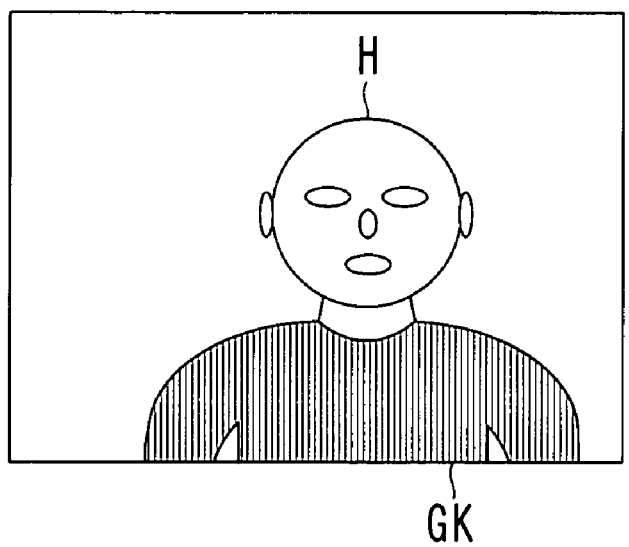
FIG. 8 is a diagram showing an example of a bust image.
Figure 9:
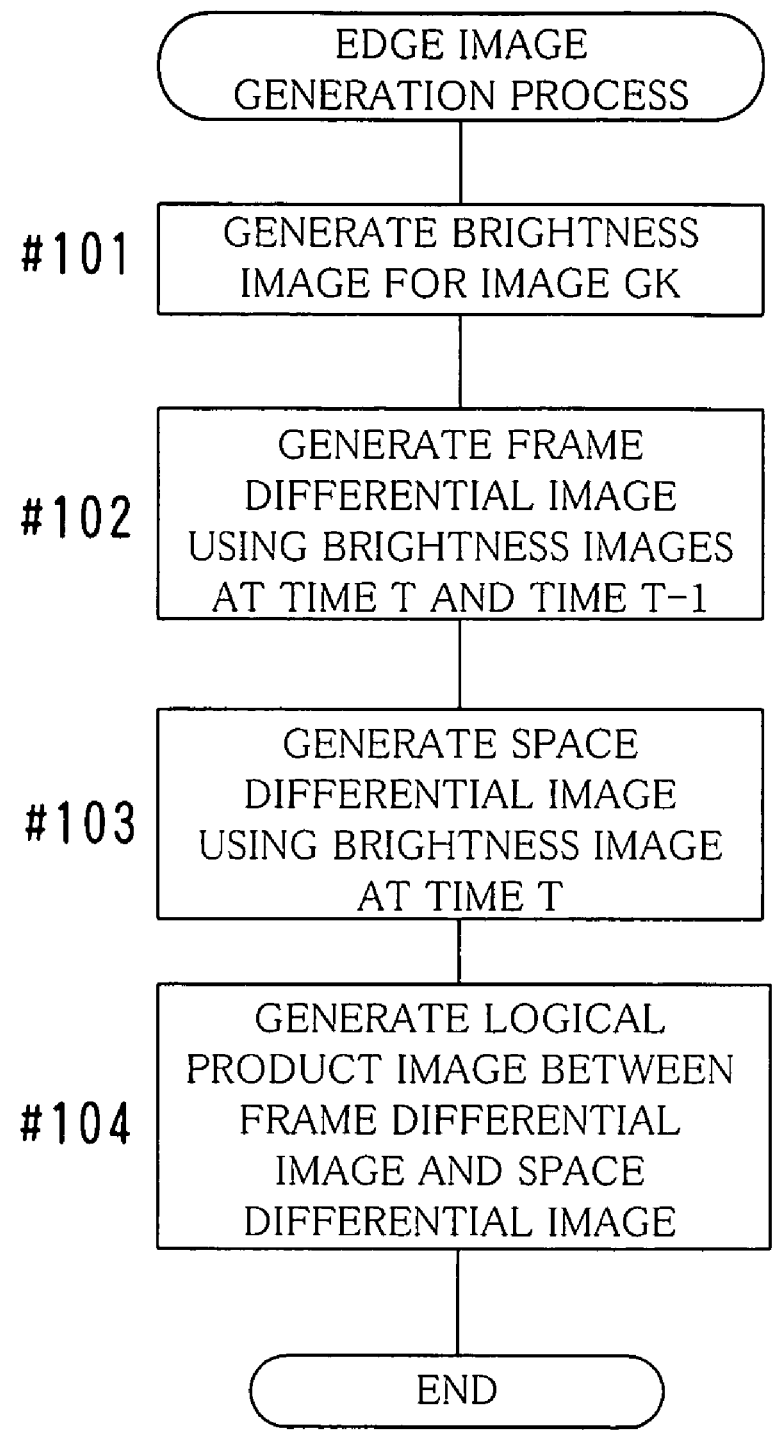
FIG. 9 is a flowchart explaining an example of a flow of a process for generating an edge image.
Figure 10:
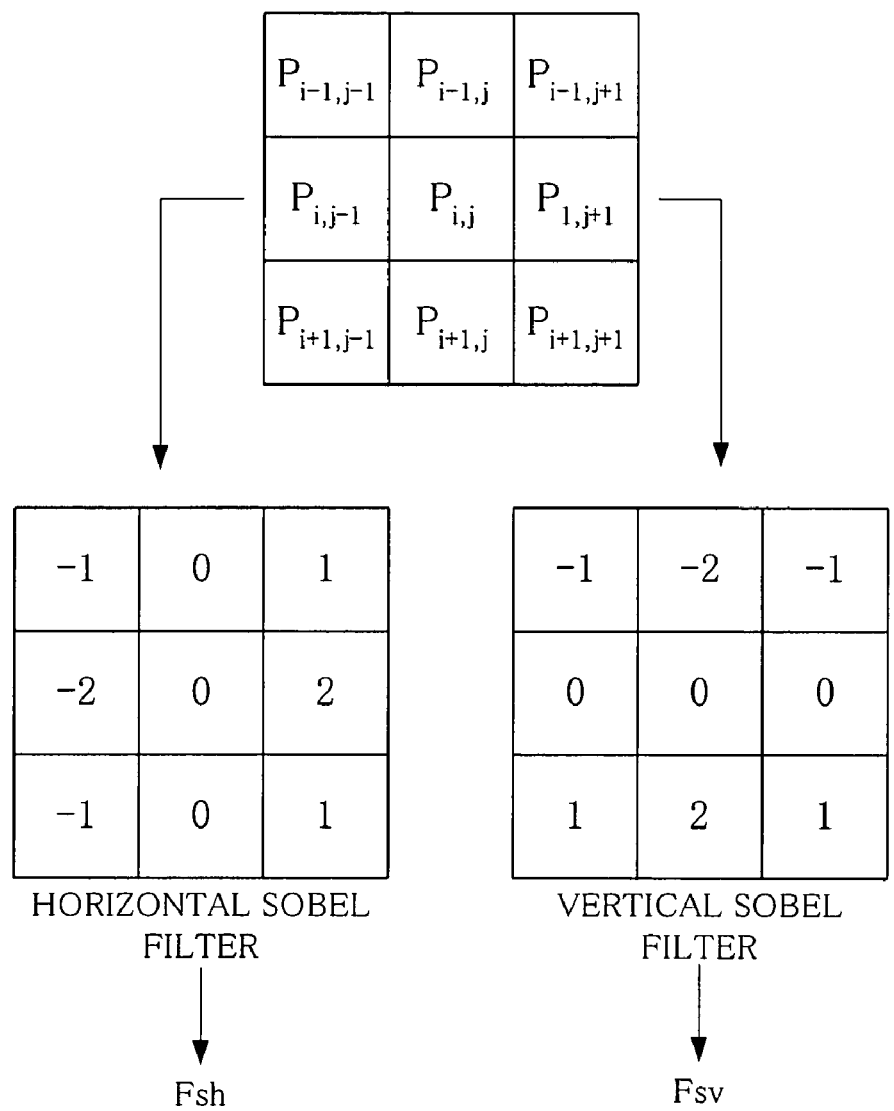
FIG. 10 is a diagram explaining about a SOBEL filter.
Figure 11:
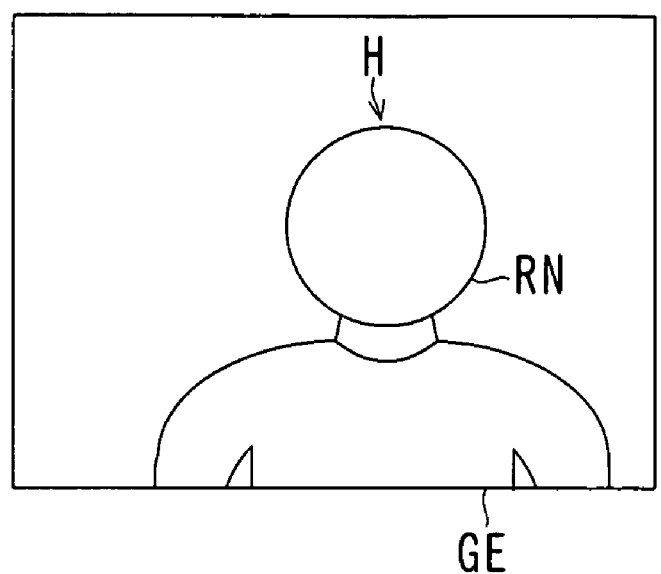
FIG. 11 is a diagram showing an example of the edge image.
Figure 12:
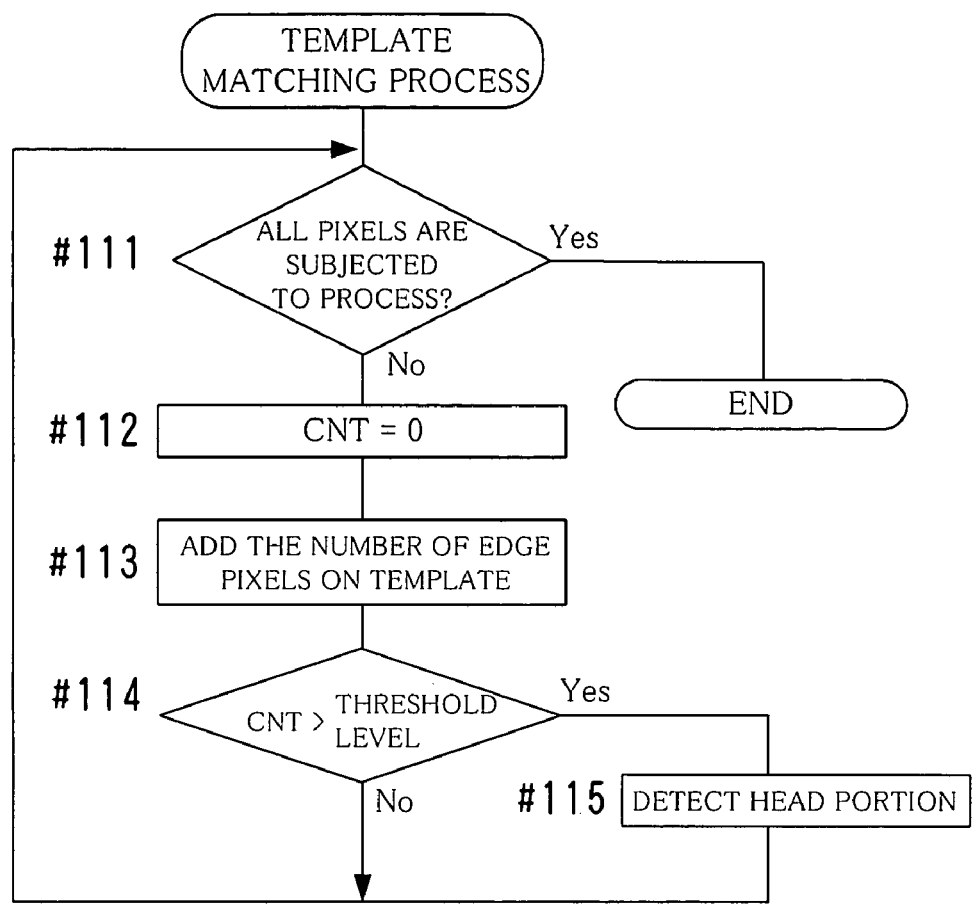
FIG. 12 is a flowchart explaining an example of a flow of a template matching process.
Figure 13:
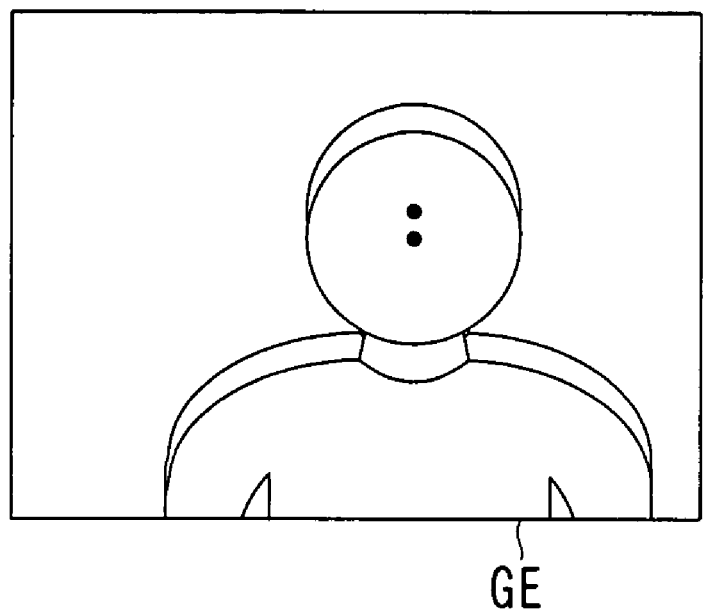
FIG. 13 is a diagram showing an example of the edge image and the detected head position in the case where two passersby are in the picture.

FIG. 1 is a diagram showing an example of a general structure of a monitoring system 100, FIG. 2 is a diagram showing an example of a hardware structure of a human body detection apparatus 1, FIG. 3 is a diagram showing an example of a functional structure of the human body detection apparatus 1, FIG. 4 is a diagram showing an example of an image G obtained by using a video camera 2, FIGS. 5A and 5B are diagrams showing examples of templates TP1 and TP2, FIGS. 6A-6C are diagrams showing an example of a method for generating the templates TP1 and TP2, FIG. 7 is a diagram showing an example of a structure of a head position detection portion 103, FIG. 8 is a diagram showing an example of a bust image GK, FIG. 9 is a flowchart explaining an example of a flow of a process for generating an edge image, FIG. 10 is a diagram explaining about a SOBEL filter, FIG. 11 is a diagram showing an example of the edge image GE, FIG. 12 is a flowchart explaining an example of a flow of a template matching process, and FIG. 13 is a diagram showing an example of the edge image GE and the detected head position in the case where two passersby H are in the picture.

As shown in FIG. 1, the monitoring system 100 includes the human body detection apparatus 1 according to the present invention, the video camera 2 and a communication line 3. The human body detection apparatus 1 and the video camera 2 are connected to each other via the communication line 3. As the communication line 3, LAN, a public telephone network, a private line or the Internet is used.

The video camera 2 includes an image sensor such as a CCD, an optical system, an interface for transmitting and receiving data with an external device, and a control circuit, so as to transmit an image obtained by shooting as image data 70 to the human body detection apparatus 1.

This video camera 2 is installed at a passage or a gateway of a facility such as a shop, an underground mall, a building or an event floor, a downtown, an ATM corner in a bank, or other places at a ceiling, where people walk or visit. Hereinafter, the case will be explained where the video camera 2 is installed at a passage ST of a facility for monitoring a state of the passage ST.

The human body detection apparatus 1 includes a CPU 1a, a RAM 1b, a ROM 1c, a magnetic storage device (a hard disk drive) 1d, a communication interface 1e, a display device 1f and an input device 1g such as a mouse or a keyboard as shown in FIG. 2.

In the magnetic storage device 1d, programs and data are installed for realizing functions of an image data reception portion 101, a template memory portion 102, a head position detection portion 103, a head image display portion 104, a head image storing portion 105, as shown in FIG. 3. These programs and data are loaded into the RAM 1b if necessary, and the program is executed by the CPU 1a.

This human body detection apparatus 1 is installed in a control room of a facility, so that a guard can monitor a state of the passage ST staying in the control room. In addition, a head of a passerby whose picture is in the image taken by the video camera 2 is detected and is displayed in an enlarged manner. The image of the head can be stored. As the human body detection apparatus 1, a workstation or a personal computer may be used.

Hereinafter, processes of portions of the human body detection apparatus 1 shown in FIG. 3 when detecting a head of a passerby whose picture is in an image taken by the video camera 2 will be explained.

The image data reception portion 101 receives image data 70 that are sent from the video camera 2. Thus, an image G as shown in FIG. 4 including plural frames corresponding to a camera speed of the video camera 2 is obtained.

The template memory portion 102 memorizes a template TP as shown in FIG. 5A or 5B, which is used for detecting a head position of a passerby H whose picture is in the image G. The template TP1 shown in FIG. 5A is a template having a half elliptical shape corresponding to an upper half of a human head, while the template TP2 shown in FIG. 5B is a template of a shape corresponding to human shoulders. These templates TP are generated as follows, for example.

First, a picture of a person to be a model is taken, who stands on a reference position L1 of the passage ST (see FIG. 1) by using the video camera 2. It is preferable that the person to be a model has a standard body shape. As shown in FIG. 6A, a contour portion of the model in the image obtained by the shooting is noted.

One open curve indicating the upper half of the head and two open curves indicating the shoulders in the contour portion are extracted as edges EG1 and EG2 (hereinafter they may be called "edge EG" as a general name). On this occasion, two positions that are distant from the edges EG1 and EG2 are set as reference points CT1 and CT2, respectively. These reference points CT1 and CT2 are also extracted together with the edges EG1 and EG2. Thus, template images as shown in FIGS. 6B and 6C can be obtained. Furthermore, the reference points CT1 and CT2 may be set to predetermined positions on the edges EG1 and EG2, respectively.

In addition, the template TP is related to position relationship information SI that indicates a vector from the reference point of the template TP to the center CT0 of the head of the model. The position relationship information SI of the template TP2 becomes a vector $\alpha 2$ shown in FIG. 6A. The position relationship information SI of the template TP1 becomes a zero vector since the CT0 is identical to the reference point CT1. The position relationship information SI is used for correcting a shift of position in template matching (for adjusting an offset (HOFFSET or VOFFSET)) that will be explained later. In this way, the templates TP1 and TP2 are generated.

With reference to FIG. 3 again, the head position detection portion 103 includes a bust image extraction portion 201, an edge image generation portion 202 and a center searching portion 203 as shown in FIG. 7. This structure is used for performing a process for calculating a head position of a passerby H who is walking along the passage ST.

The bust image extraction portion 201 extracts a predetermined image area that is assumed to include the bust of the passerby H (the area enclosed by a broken line in FIG. 4) from the image G obtained by the image data reception portion 101 and magnifies the extracted bust image area by a predetermined magnification. Thus, a bust image GK of the passerby H who is walking along the passage ST can be obtained as shown in FIG. 8.

The edge image generation portion 202 generates an edge image (a contour image) of the bust image GK obtained by the bust image extraction portion 201 in the steps as shown in FIG. 9.

As shown in FIG. 9, brightness images (variable density images) are generated first for the bust image GK and for the bust image GK' at a time before the bust image GK (#101). Differential between pixels corresponding to each other in the two brightness images (a frame differential) is calculated. Namely, a time differential is calculated so as to generate a time differential image (#102). Simultaneously or prior to or subsequent to this, a space differential image that indicates an intensity of change in the brightness (an intensity of edge) in the brightness image of the bust image GK is generated (#103). The space differential image is calculated by multiplying each pixel Pij and surrounding pixels P of the brightness image by the horizontal SOBEL filter and the vertical SOBEL filter for the bust image GK as shown in FIG. 10 and by assigning the obtained images Fsh and Fsv into the following equation (1).

$$E = \sqrt{Fsh^2 + Fsv^2} \qquad (1)$$

Here, Fsh represents an output result of the horizontal SOBEL filter, and Fsv represents an output result of the vertical SOBEL filter.

A logical product between pixels corresponding to each other of the time differential image and the space differential image that were calculated in the steps #102 and #103 is calculated (#104). Thus, the edge image GE of the bust image GK as shown in FIG. 11 is generated. Furthermore, the edge image GE in FIG. 11 as well as in each diagram that will be explained later is shown reversely concerning black and white for easy view.

With reference to FIG. 7 again, the center searching portion 203 searches a center of the head of the passerby H by performing the template matching using the template TP. This search is performed by the procedure shown in FIG. 12. Here, the example that utilizes the template TP1 shown in FIG. 5A will be explained.

As shown in FIG. 12, a counter is reset to "0" (#112). The template TP1 is overlapped with the edge image GE so that the point AP1 of the template TP1 shown in FIG. 5A matches one of corner pixels of the edge image GE shown in FIG. 11 (e.g., a pixel at the upper left corner). The number of pixels in the overlapping area of the edge RN (the contour line) of the edge image GE with the edge EG of the template TP1 (pixels to be matched) is counted and is assigned into the counter (#113).

If a value of the counter exceeds the threshold level (Yes in #114), a pixel of the edge image GE overlapping the reference point CT1 of the template TP1 is decided to be a center of the head of the passerby H or a vicinity of the center (#115).

Going back to the step #112, the template TP1 that is overlapped with the edge image GE is moved to slide one by one pixel, so that the above-explained process from the step #112 through the step #115 is executed sequentially for the entire of the edge image GE (No in #111).

In this way, the head position of the passerby H can be found. Furthermore, when the process shown in FIG. 12 is performed for the edge image GE in which two passersby H are walking in tandem as shown in FIG. 13, two head positions of the passersby H are found as shown by dots in FIG. 13.

In addition, when performing the template matching by utilizing the template TP2 shown in FIG. 5B, the position relationship information SI is applied to calculation of a center of the head in the step #115 as shown in FIG. 12. Namely, if a value of the counter exceeds a threshold level (Yes in #114), a pixel of the edge image GE overlapping the reference point CT2 of the template TP2 is found. This pixel points a position around the center of the chest (a midpoint between shoulders). Therefore, the position (pixel), which is shifted from this pixel by the vector $\alpha 2$ indicated in the position relationship information SI, is regarded as a position of the center of the head of the passerby H or the vicinity of the center.

With reference to FIG. 3 again, the head image display portion 104 extracts an area of the head of the passerby H from the image G in accordance with the detection (search) result by the head position detection portion 103 and magnifies the extracted area, which is displayed as an enlarged image on the display device 1f (see FIG. 2). Thus, the guard can identify the passerby H easily. In addition, the head image storing portion 105 stores (records) the enlarged image of the head of the passerby H in the magnetic storage device 1d or an external recording medium (such as a DVD-ROM, a MO or a CD-R).

Figure 14:
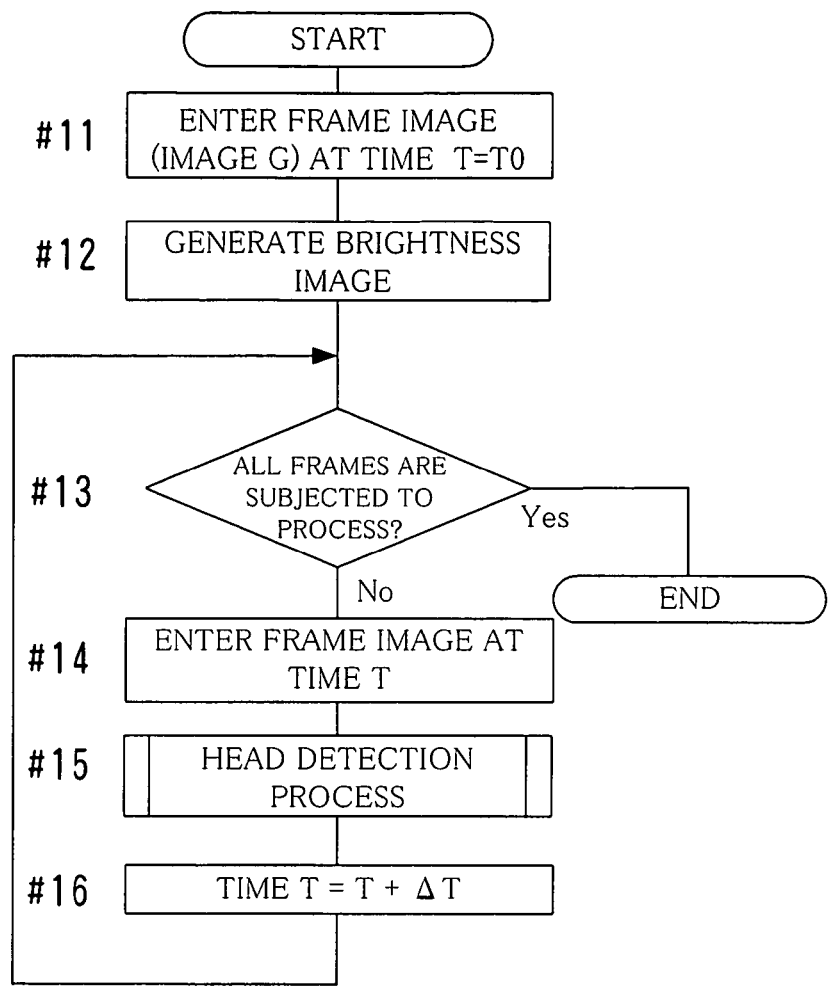
FIG. 14 is a flowchart explaining an example of a flow of a process by the human body detection apparatus in a first embodiment.
Figure 15:
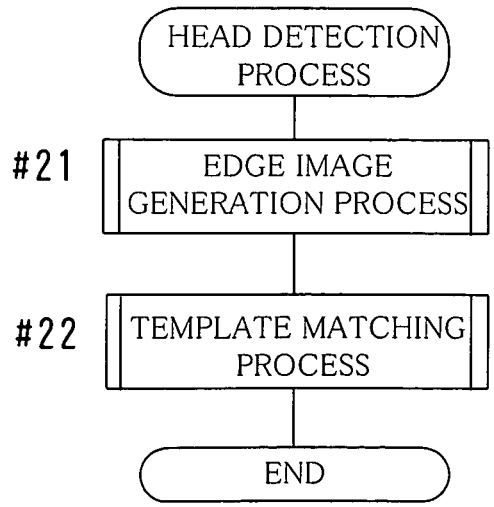
FIG. 15 is a flowchart explaining an example of a head detection process.

FIG. 14 is a flowchart explaining an example of a flow of a process by the human body detection apparatus 1 in the first embodiment, and FIG. 15 is a flowchart explaining an example of a head detection process. Next, a flow of a process by the human body detection apparatus 1 when monitoring the passage ST will be explained with reference to the flowchart.

As shown in FIG. 14, when monitor of the passage ST is started, the human body detection apparatus 1 enters a frame image (an image G) of the video camera 2 at the time T=T0 (#11) and generates a brightness image of the image (#12).

The human body detection apparatus 1 enters the image G at the next time (e.g., after 1/30 seconds if the camera speed is 30 frames per second) (#14) and performs a process for detecting the head of the passerby H from the image G (#15). Namely, as shown in FIG. 15, a contour (an edge) of the passerby H in the image G is extracted so that the edge image GE is generated (#21). Then, the template matching is performed for the edge image GE (#22). The procedure of generating the edge image GE and the procedure of the template matching were already explained with reference to FIG. 9 and FIG. 12, respectively.

As a result of the template matching, a position of the passerby H in the image G is detected. Furthermore, if the passerby H does not exist in the image G, the edge image GE is not obtained (a black image is obtained), so the passerby H is not detected naturally even if the template matching is performed.

Hereinafter, the process of the steps #14 and #15 are repeated sequentially every time when the video camera 2 enters the image G (No in #13). In this way, the head of the passerby H who walks along the passage ST can be captured.

Second Embodiment

Figure 16:
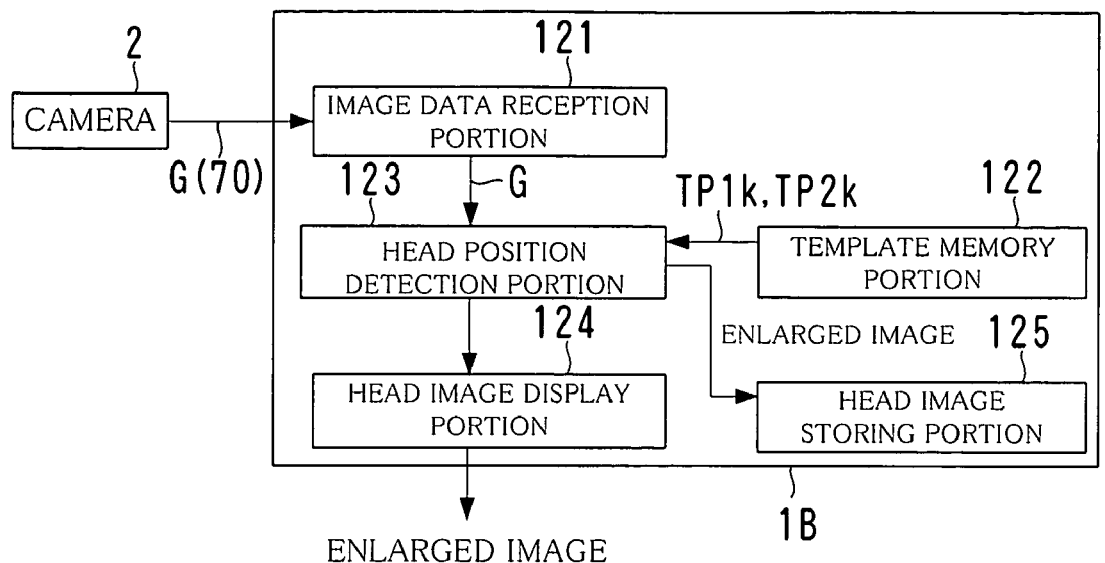
FIG. 16 is a diagram showing an example of a functional structure of the human body detection apparatus in a second embodiment.
Figure 17A:
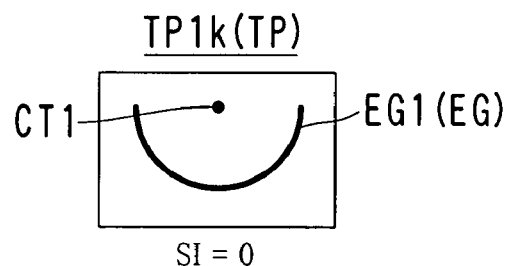
FIGS. 17A and 17B are diagrams showing examples of the templates in the second embodiment.
Figure 18:
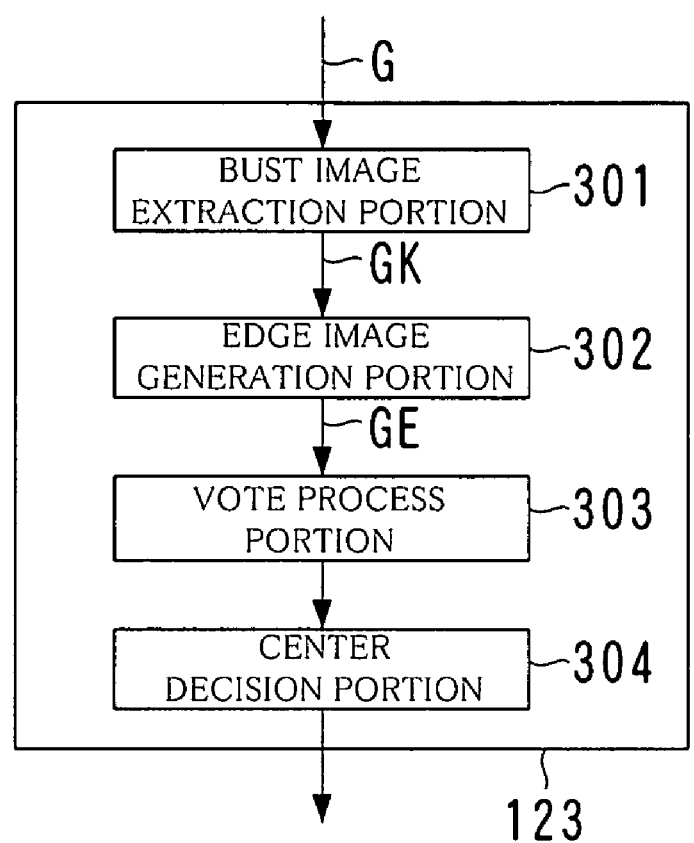
FIG. 18 is a diagram showing an example of a structure of the head position detection portion.
Figure 19:
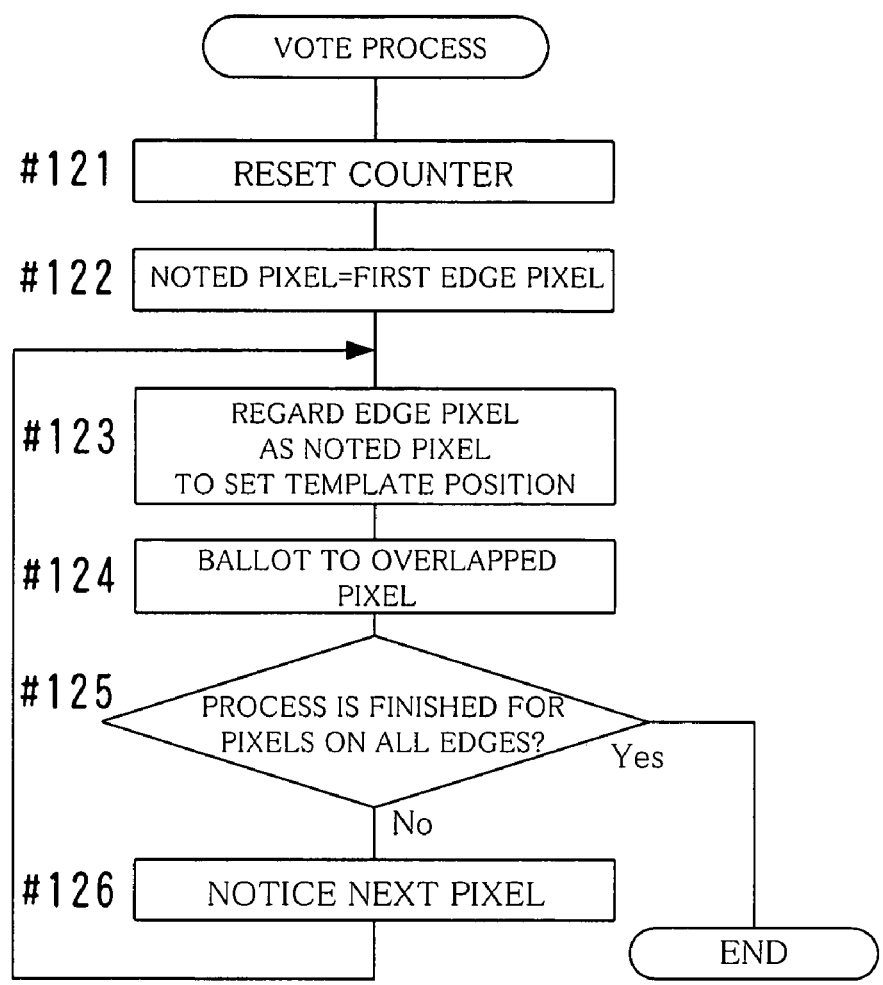
FIG. 19 is a flowchart explaining an example of a flow of a vote process.
Figure 21:
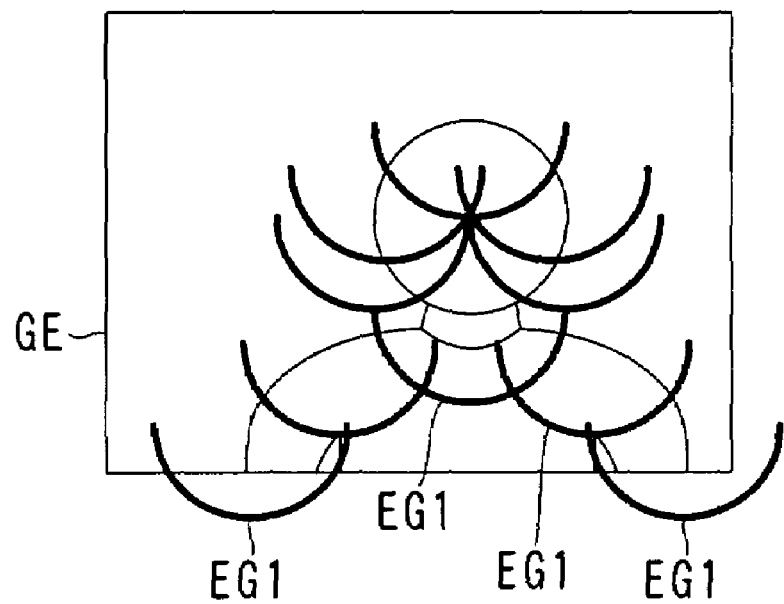
FIG. 21 is a diagram showing an example of overlapping of the edge image with the template image when the vote process is performed.
Figure 22:
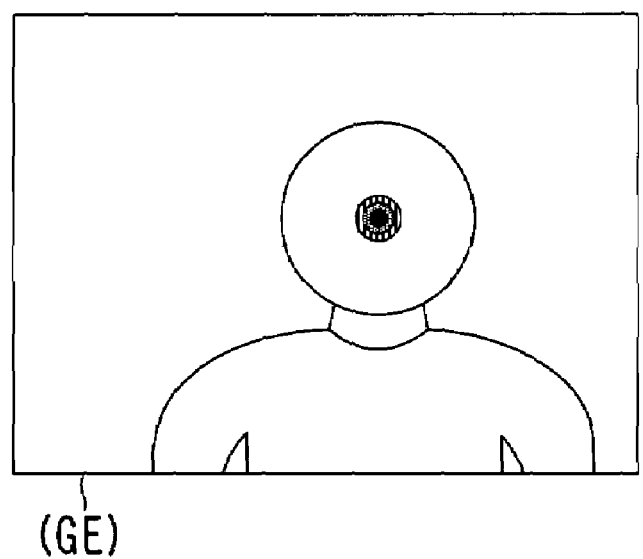
FIG. 22 is a diagram showing an example of a variable density image, such as a gray scale image, indicating the number of votes obtained.
Figure 23A:
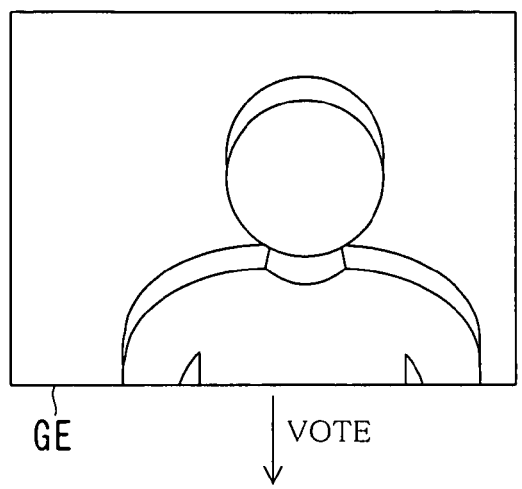
FIGS. 23A-23C are diagrams showing an example of matching of the edge image with the template when two passersby are in the picture.
Figure 23B:
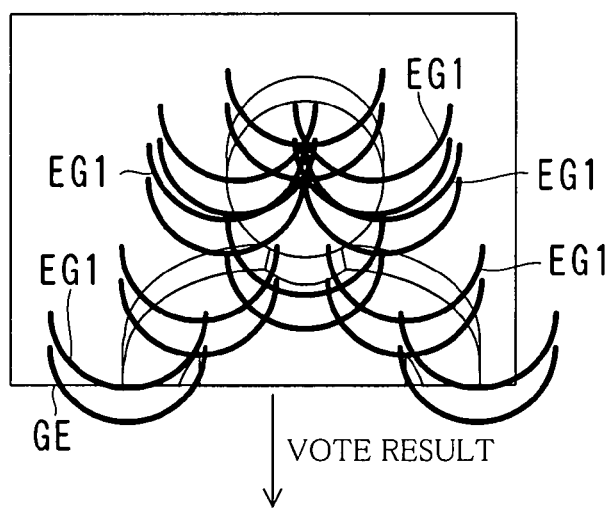
Figure 23C:
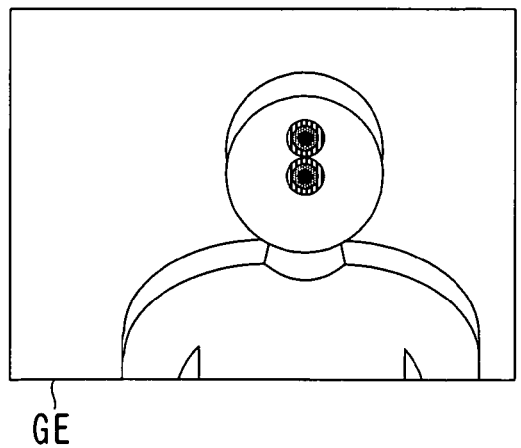
Figure 24:
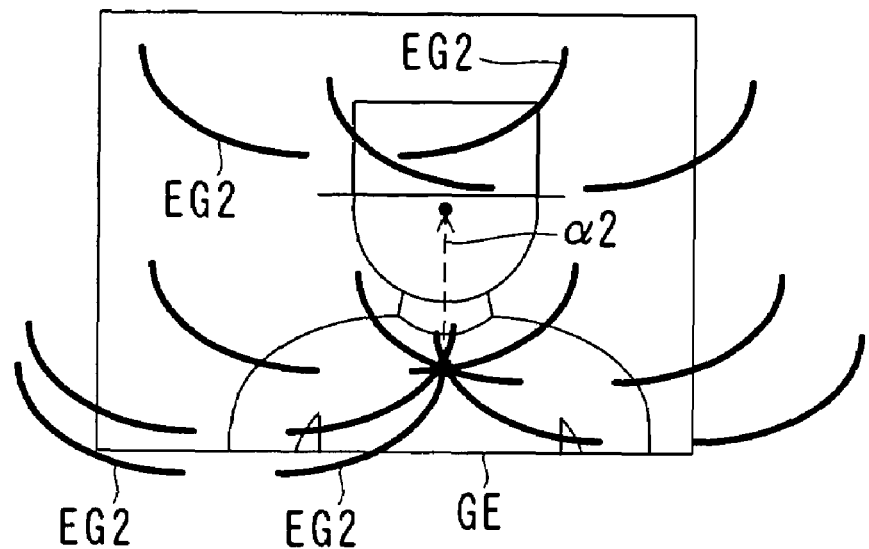
FIG. 24 is a diagram showing an example of matching with the template when the template shown in FIG. 17B is used.

FIG. 16 is a diagram showing an example of a functional structure of the human body detection apparatus 1B in a second embodiment, FIGS. 17A and 17B are diagrams showing examples of the templates TP1$k$ and TP2$k$ in the second embodiment, FIG. 18 is a diagram showing an example of a structure of a head position detection portion 123, FIG. 19 is a flowchart explaining an example of a flow of a vote process, FIGS. 20A and 20B are diagrams explaining a method for matching with the template in the vote process, FIG. 21 is a diagram showing an example of overlapping of the edge image GE with the template image when the vote process is performed, FIG. 22 is a diagram showing an example of a variable density image, such as a gray scale image, indicating the number of votes obtained, FIGS. 23A-23C are diagrams showing an example of matching of the edge image GE with the template when two passersby H are in the picture and FIG. 24 is a diagram showing an example of matching with the template when the template TP2$k$ shown in FIG. 17B is used.

In the first embodiment, the head of the passerby H is detected in accordance with the number of intersection points of the edge EG of the template TP (see FIG. 5) and the edge RN of the edge image GE (see FIG. 11). In the second embodiment, the head of the passerby H is detected by using Hough transformation method (a vote process).

The general structure of the monitoring system 100 and the hardware structure of the human body detection apparatus 1B in the second embodiment are the same as the case of the first embodiment (see FIGS. 1 and 2). However, programs and data are installed in the magnetic storage device 1$d$ of the human body detection apparatus 1B for realizing functions including an image data reception portion 121, a template memory portion 122, a head position detection portion 123, a head image display portion 124 and a head image storing portion 125 as shown in FIG. 16. Hereinafter, functions and processes that are different from the case of the first embodiment will be explained mainly. Explanation of functions and processes that are the same as the case of the first embodiment will be omitted.

Figure 17:
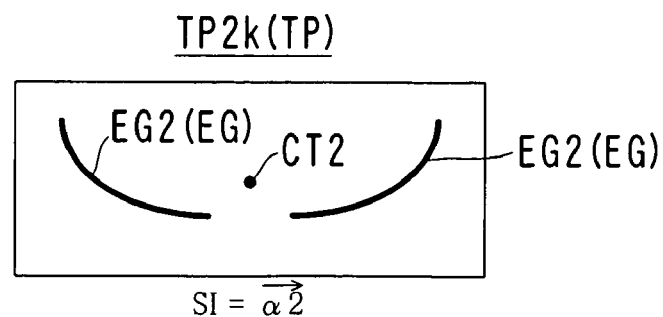

The image data reception portion 121 receives the data of the image G as shown in FIG. 4 (image data 70) similarly to the image data reception portion 101 of the first embodiment (see FIG. 3). The template memory portion 122 memorizes the template TP (TP1$k$ and TP2$k$) as shown in FIG. 17. The templates TP1$k$ and TP2$k$ are generated by rotating the templates TP1 and TP2 shown in FIG. 5 around the reference points CT1 and CT2 by a half-turn (by 180 degrees), respectively. The position relationship information SI is the same of that in the first embodiment.

The head position detection portion 123 includes a bust image extraction portion 301, an edge image generation portion 302, a vote process portion 303 and a center decision portion 304 as shown in FIG. 18. The head position detection portion 123 performs a process for calculating the head position of the passerby H who walks along the passage ST.

The bust image extraction portion 301 and the edge image generation portion 302 perform a process that is similar to that of the bust image extraction portion 201 and the edge image generation portion 202 in the first embodiment shown in FIG. 7, so as to generate the edge image GE as shown in FIG. 11.

The vote process portion 303 performs the vote process in the procedure as shown in FIG. 19, so as to calculate a degree of likelihood to be a center of the head of the passerby H for each pixel of the edge image GE (Hereinafter referred to as a "degree of center"). Here, the case where the template TP1$k$ shown in FIG. 17A is used will be explained as an example.

As shown in FIG. 19, a counter is set to each pixel of the edge image GE first, and all the counters are preset to "0" (#121).

As shown in FIG. 20A, one pixel on the edge RN of the edge image GE (a contour line) is noted (Hereinafter the pixel that is noted is referred to as a "noted pixel"). The template image of the template TP1$k$ is overlapped with the edge image GE so that the noted pixel becomes identical to the reference point CT1 of the template TP1$k$ (#122 and #123).

On this occasion, one vote is balloted to the pixel of the edge image GE that is overlapped with the edge EG1 of the template TP1$k$ (#124). Namely, the counter of the pixel shown with hatching in the enlarged diagram shown in FIG. 20B is incremented. Furthermore, in FIG. 20B, a square of thick frame indicates a pixel on the edge RN of the edge image GE, a square filled in black indicates the noted pixel, and a square with hatching indicates a pixel overlapped with the edge EG1 of the template TP1$k$, i.e., the pixel to which one vote is balloted.

Pixels on other edges RN are also noted in turn (#126) and are overlapped with the template TP1$k$ as shown in FIG. 21 (#123), so that the count (the ballot) is performed (#124). Then, when the process in the steps #123 and #124 is finished for pixels on all edges RN (Yes in #125), the ballot concerning the degree of center is completed.

With reference to FIG. 18 again, the center decision portion 304 decides the center of the head of the passerby H in accordance with the result of the ballot performed by the vote process portion 303 as follows. Namely, as shown in FIG. 22, a gray scale is assigned to each pixel of the edge image GE in accordance with the number of votes obtained. In this embodiment, the larger the number of votes obtained is, the darker the pixel is. Then, it is decided that the pixel at the peak of the dark portion that appears is the center of the head of the passerby H.

As explained above, the position of the head of the passerby H can be found. Furthermore, when the vote process shown in FIG. 19 is performed for the edge image GE in which two passersby H are walking in tandem as shown in FIG. 23A (see FIG. 23B) so as to assign a gray scale to each pixel in accordance with the number of votes obtained, two peaks may be determined as shown in FIG. 23C. Namely, the position of the head of the passerby H may be detected for each of two persons.

Also in the case where the template TP2k shown in FIG. 17B is used, the vote process may be performed as shown in FIG. 24 in the procedure explained above. However, the center of the head of the passerby H is regarded to be a position that is shifted from the pixel to which the most votes are balloted by the vector α2 that is indicated in the position relationship information SI (see FIG. 6A). If the center is not shifted, a center of the chest of the passerby H (a midpoint between shoulders) may be detected.

With reference to FIG. 16 again, the head image display portion 124 and the head image storing portion 125 respectively perform the same processes as the head image display portion 104 and the head image storing portion 105 in the first embodiment. Namely, an enlarged image of the head of the passerby H is displayed on the display device 1f (see FIG. 2) and is stored (recorded) in the magnetic storage device 1d or in an external recording medium.

Figure 25:
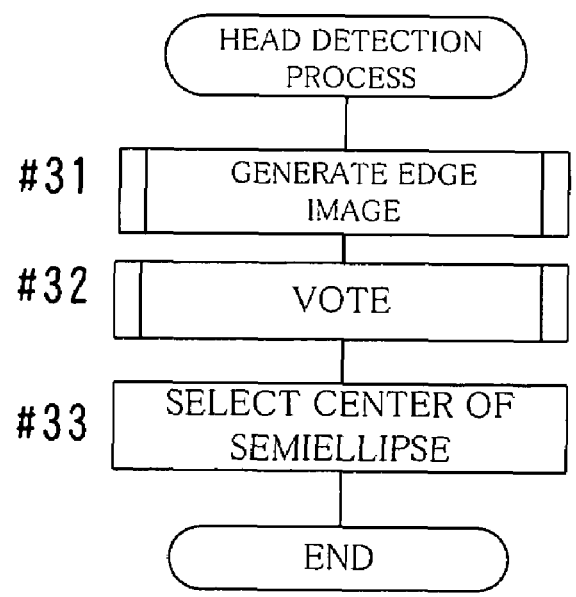
FIG. 25 is a flowchart explaining an example of the head detection process in the second embodiment.

FIG. 25 is a flowchart explaining an example of the head detection process in the second embodiment. Next, a flow of a process by the human body detection apparatus 1B when monitoring the passage ST in the second embodiment will be explained.

The procedure of the process in monitoring the passerby in the second embodiment is basically the same as the procedure of the process in the first embodiment shown in FIG. 14. However, the procedure of the head detection process in the step #15 is different from the case of the first embodiment.

The human body detection apparatus 1B starts to monitor the passage ST so as to enter an initial frame image and to generate a brightness image (#11 and #12 in FIG. 14). Then, it enters the image G taken by the video camera 2 (frame image) sequentially and performs the head detection process in accordance with the image G (Yes in #13 in FIG. 14, #14 and #15).

The head detection process is performed by the procedure shown in FIG. 25. Namely, the entered image G and the image G at the previous time are used for generating the edge image GE (#31), and ballot of a degree of center of the head is performed for each pixel of the edge image GE (#32). Then, a variable density image as shown in FIG. 22 or FIG. 23C is generated in accordance with the number of votes obtained, so as to determine (select) a pixel to be a peak as a center of the head (#33). However, if the template TP2k shown in FIG. 17B is used, position adjustment is performed in accordance with the position relationship information SI. The detail of the process in the steps #31 and #32 was already explained with reference to FIGS. 9 and 19.

Third Embodiment

Figure 26:
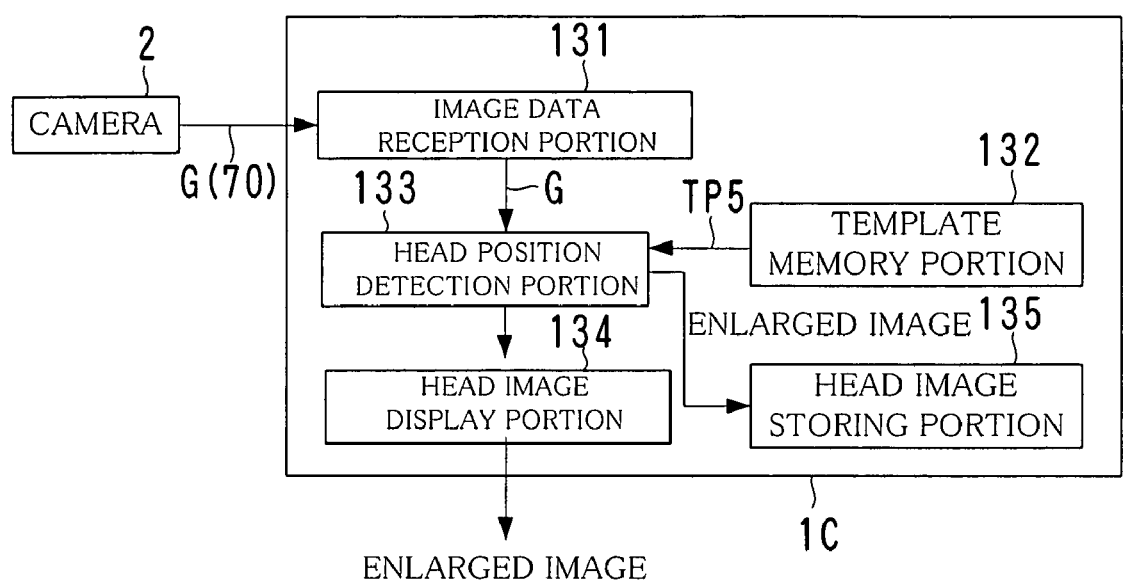
FIG. 26 is a diagram showing an example of a functional structure of the human body detection apparatus in a third embodiment.
Figure 27A:
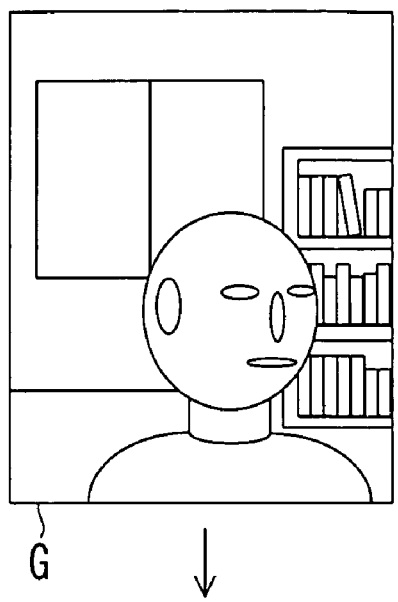
FIGS. 27A-27C are diagrams explaining an example of a method for generating a background differential image.
Figure 27B:
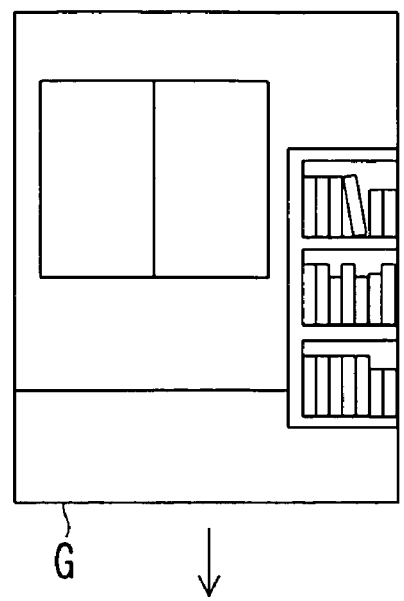
Figure 27C:
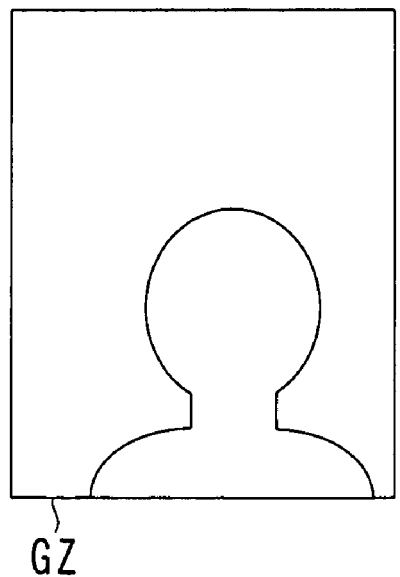
Figure 28:
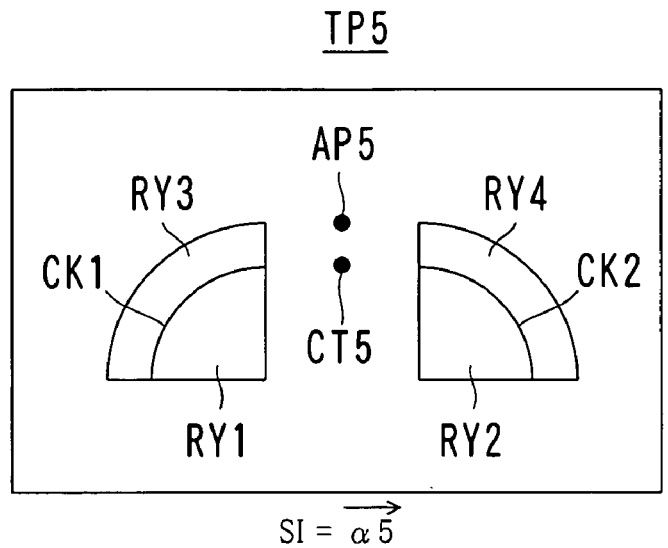
FIG. 28 is a diagram showing an example of the template in the third embodiment.
Figure 29:
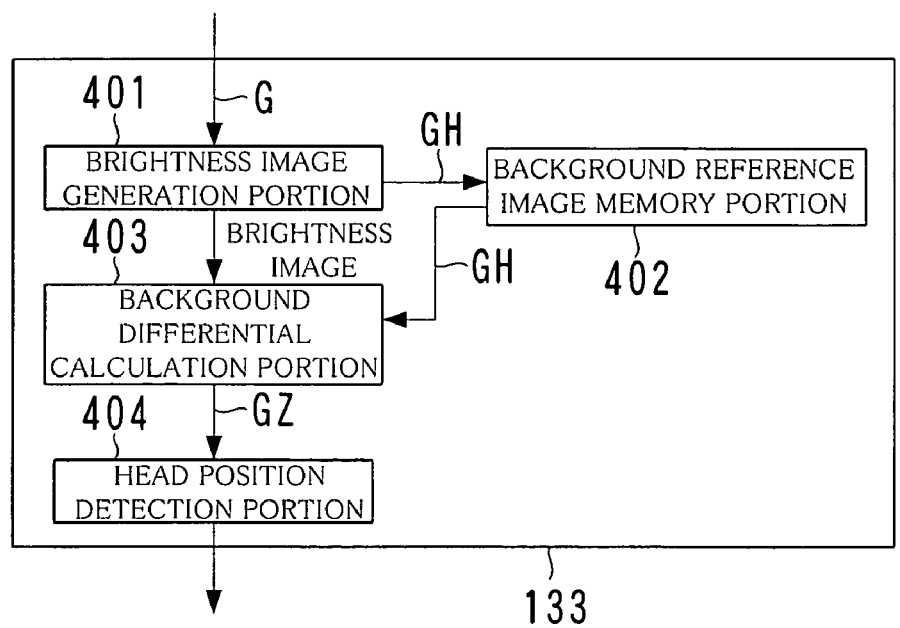
FIG. 29 is a diagram showing an example of a structure of the head position detection portion in the third embodiment.
Figure 30:
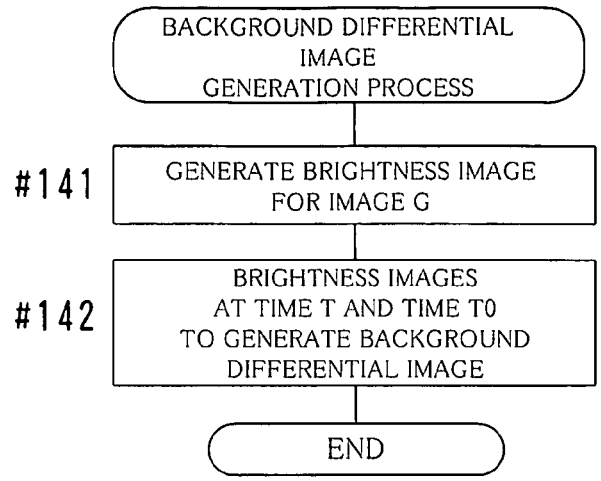
FIG. 30 is a flowchart explaining an example of a flow of a process for generating the background differential image.
Figure 31:
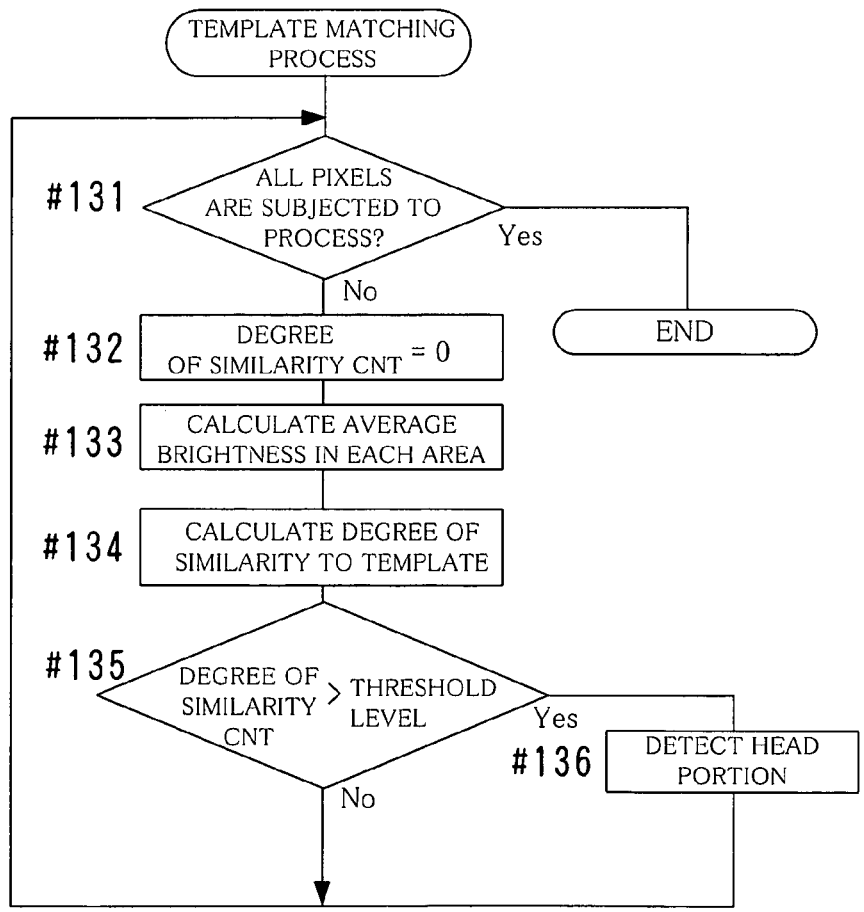
FIG. 31 is a flowchart explaining an example of a flow of a template matching process in the third embodiment.
Figure 32:
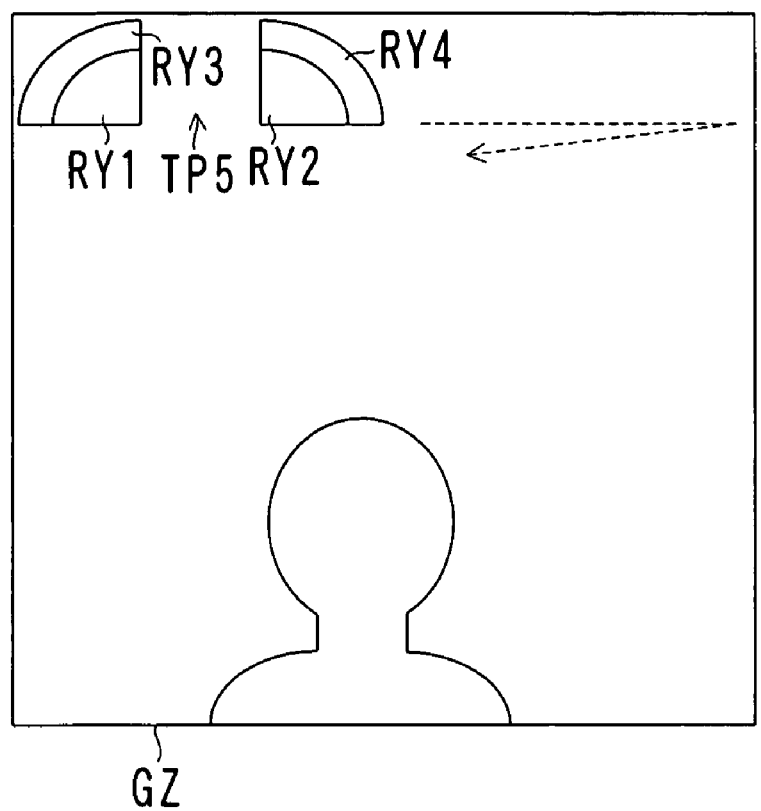
FIG. 32 is a diagram showing an example of a log of the template matching in the third embodiment.

FIG. 26 is a diagram showing an example of a functional structure of the human body detection apparatus 1C in a third embodiment, FIGS. 27A-27C are diagrams explaining an example of a method for generating a background differential image GZ, FIG. 28 is a diagram showing an example of the template TP5 in the third embodiment, FIG. 29 is a diagram showing an example of a structure of a head position detection portion 133 in the third embodiment, FIG. 30 is a flowchart explaining an example of a flow of a process for generating the background differential image, FIG. 31 is a flowchart explaining an example of a flow of a template matching process in the third embodiment and FIG. 32 is a diagram showing an example of a log of the template matching in the third embodiment.

In the first and the second embodiments, the template matching process is performed on the edge image. In the third embodiment, the template matching process is performed on the brightness image.

The general structure of the monitoring system 100 and the hardware structure of the human body detection apparatus 1C in the third embodiment are the same as the case of the first embodiment (see FIGS. 1 and 2). However, programs and data are installed in the magnetic storage device 1d of the human body detection apparatus 1C for realizing functions including an image data reception portion 131, a template memory portion 132, a head position detection portion 133, a head image display portion 134 and a head image storing portion 135 as shown in FIG. 26. Hereinafter, functions and processes that are different from the case of the first or the second embodiment will be explained mainly. Explanation of functions and processes that are the same as the case of the first or the second embodiment will be omitted.

The image data reception portion 131 shown in FIG. 26 receives data of an image G (image data 70) taken by the video camera 2 as shown in FIGS. 27A and 27B in the same way as the image data reception portion 101 (see FIG. 3) in the first embodiment. The template memory portion 132 memorizes the template TP5 as shown in FIG. 28. An arc CK1 located at the boundary between the areas RY1 and RY3, an arc CK2 located at the boundary between the areas RY2 and RY4, and a distance between the two arcs CK1 and CK2 are determined by taking an image of shoulders of a model having a standard body shape by the video camera 2 and by referring the image of the shoulders. In addition, position relationship information SI that indicates a vector from the reference point CT5 of the template image to the center CT0 of the head (see FIG. 6A) is assigned in the same way as the templates TP in the first and the second embodiments.

The head position detection portion 133 includes a brightness image generation portion 401, a background reference image memory portion 402, a background differential calculation portion 403 and a head position detection portion 404 as shown in FIG. 29, so as to perform a process for calculating the position of the head of the passerby H.

The brightness image generation portion 401 and the background differential calculation portion 403 perform the process by the procedure as shown in FIG. 30. The brightness image generation portion 401 generates a brightness image of the image G that is obtained by the image data reception portion 131 (#141 in FIG. 30). An image of the background without the passerby H is made a background reference image GH out of the generated brightness image.

The background differential calculation portion 403 generates a background differential image GZ from which the background portion is removed as shown in FIG. 27C by calculating the differential between the brightness image of the image G to be used for detecting head (FIG. 27A) and the background reference image GH (#142). Furthermore, though the background portion is really dark, it is shown in white in FIG. 27C for easy view.

The background reference image memory portion 402 memorizes the background reference image GH. The background reference image GH is updated if necessary. The head position detection portion 404 detects the position of the head of the passerby H in the image G by performing the template matching on the background differential image GZ by the procedure shown in FIG. 31.

Namely, as shown in FIG. 31, the counter is preset to "0" first (#132). The template TP5 is overlapped with the background differential image GZ so that the point AP5 of the template TP5 becomes identical to one of the corner pixels (e.g., a pixel at the upper left corner) of the background differential image GZ. On this occasion, an average brightness of portions that are overlapped with the areas RY1-RY4 of the template TP5 within the background differential image GZ is calculated (#133).

Then, probability that the shoulders of the passerby H are in the portion of the background differential image GZ overlapped with the arcs CK1 and CK2 of the template TP5, i.e., degree of similarity of the shape of shoulders shown in the template TP5 to the portion of the background differential image GZ is calculated (#134). If the shoulders of the passerby H are in the portion, relationship among average brightness values of portions overlapped with the areas RY1-RY4 that were calculated in the step #133 should be as follows.

(A) A difference between the average brightness Md1 of the portion overlapped with the area RY1 and the average brightness Md2 of the portion overlapped with the area RY2 is small.

(B) The average brightness Md1 of the portion overlapped with the area RY1 is substantially larger than the average brightness Md3 of the portion overlapped with the area RY3.

(C) The average brightness Md2 of the portion overlapped with the area RY2 is substantially larger than the average brightness Md4 of the portion overlapped with the area RY4.

Accordingly, the degree of similarity is calculated in accordance with the equation (2), and the result of the calculation is assigned into the counter (#135).

$$\text{degree of similarity} = \text{value } A + \text{value } B + \text{value } C \quad (2)$$

Here, value $A=255-|Md1-Md2|$, value $B=Md1-Md3$, and value $C=Md2-Md4$. In addition, the degree of similarity is expressed with 8 bits, i.e., 256 gradation steps.

If a value of the counter (the degree of similarity) is larger than the threshold level (Yes in #135), it is decided that the shoulders of the passerby H are in the position overlapped with the template TP5. Then, it is decided that the position shifted from the pixel of the background differential image GZ overlapped with the reference point CT5 by the vector α5 that is indicated in the position relationship information SI is the position of the center of the head of the passerby H (#136).

With reference to step #131 again, as shown in FIG. 32, the template TP5 that is overlapped with the background differential image GZ is moved to slide by one by one pixel, while the above-mentioned process in the steps #132-#136 is performed sequentially on the entire of the background differential image GZ (No in #131).

With reference to FIG. 26 again, the head image display portion 134 and the head image storing portion 135 perform processes similar to the head image display portion 104 and the head image storing portion 105 in the first embodiment, respectively. Namely, an enlarged image of the head of the passerby H is displayed on the display device 1*f* (see FIG. 2) and stored (recorded) in the magnetic storage device 1*d* or an external recording medium.

Figure 33:
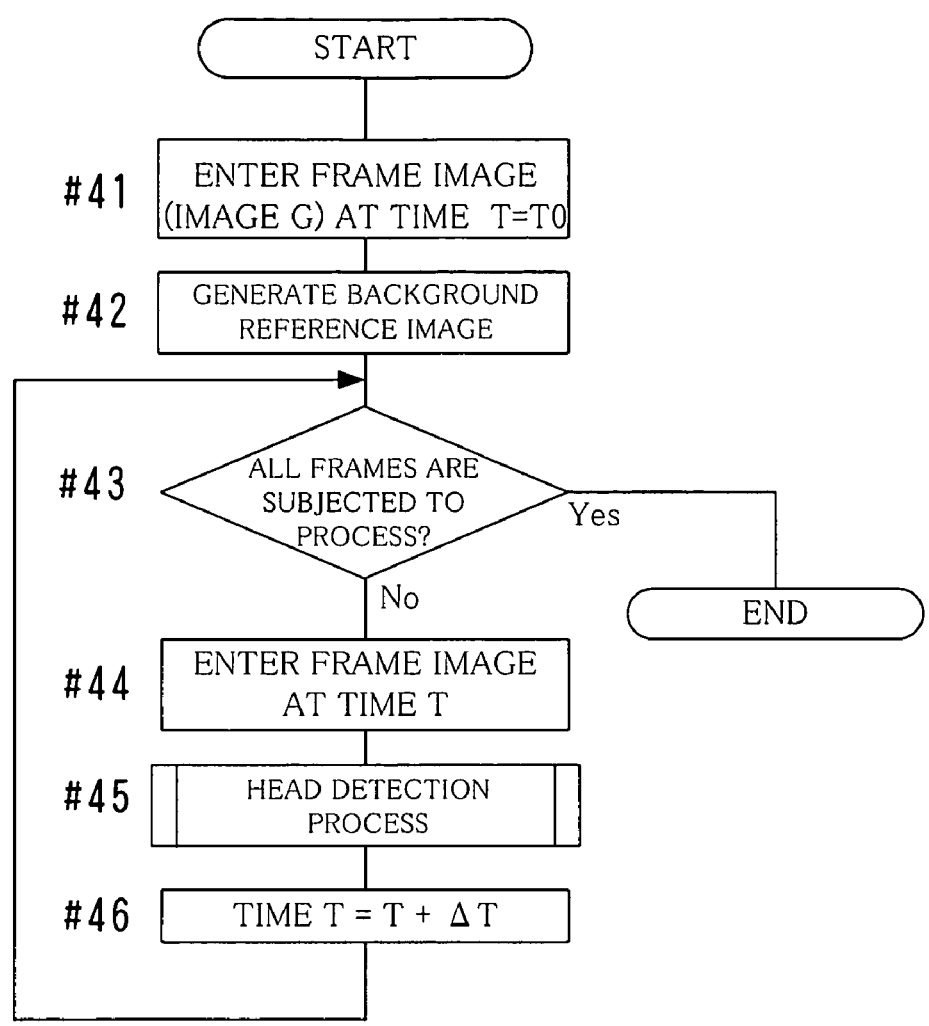
FIG. 33 is a flowchart explaining an example of a flow of a process by the human body detection apparatus in the third embodiment.
Figure 34:
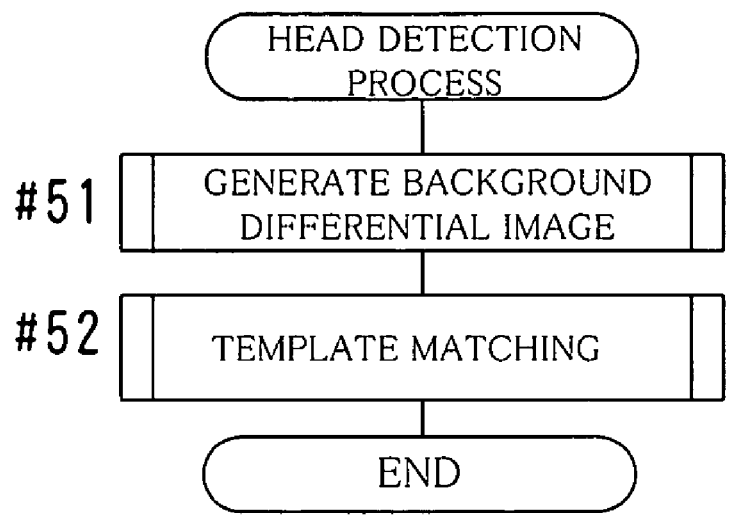
FIG. 34 is a flowchart explaining an example of a flow of the head detection process in the third embodiment.

FIG. 33 is a flowchart explaining an example of a flow of a process by the human body detection apparatus 1C in the third embodiment, and FIG. 34 is a flowchart explaining an example of a flow of the head detection process in the third embodiment. Next, a flow of a process by the human body detection apparatus 1C when monitoring the passage ST in the third embodiment will be explained with reference to the flowchart.

As shown in FIG. 33, when monitor of the passage ST is started, the human body detection apparatus 1C enters a frame image (an image G) without a passerby H from the video camera 2 (#41) and generates a brightness image (a background reference image GH) of the image (#42). The human body detection apparatus 1C enters the image G at the next time (#44) and performs a process for detecting the head of the passerby H from the image G (#45).

Namely, a background differential image GZ of the entered image G is generated as shown in FIG. 34 (#51), and the template matching is performed in the background differential image GZ (#52). The procedure for generating the background differential image GZ and the procedure of the template matching were already explained with reference to FIGS. 30 and 31.

Hereinafter, the process of the steps #44 and #45 is repeated sequentially every time when the video camera 2 takes the image G (No in #43). In this way, the position of the head of the passerby H is detected from the image taken by the video camera 2.

According to the first through the third embodiments, the template TP of the upper half of the head or the shoulders is used for the template matching, so that the passerby H who walks in front of the video camera 2 can be detected more securely than the conventional method. Namely, even if a part of the body of the passerby is hidden by another passerby or an object as shown in FIG. 13 (i.e., if an occlusion is generated), the passerby can be detected. In addition, since the small template TP such as an upper half of a head or shoulders for the template matching, the process is executed at a high speed.

In addition, since the template TP that is used is a part having little movement (variation of the shape) when the passerby is walking, the passerby can be detected more securely than the conventional method even if the passerby faces the video camera 2 in a slanting direction.

The threshold levels that are used for generating the time differential image and the space differential image and for detecting the center of the head, the SOBEL filter shown in FIG. 10, and coefficient or constant in the equations (1) and (2) can be values that may be acquired by empirical means or by experiments. They may be calculated dynamically for each image G that is entered. Instead of detecting the position of the center of the head of the passerby H, it is possible to detect a position of a center of a chest or a belly.

Although the edge image is generated by using the SOBEL filter in the first and the second embodiments, it can be generated by other means. For example, a second differential or a block matching can be used for generating it.

Although the template TP having a shape of an upper half of a head or shoulders is used for the template matching in the first through the third embodiments, other templates TP may be used. For example, a template of a part of contour of a human body such as a chin, an ear or a leg or a part of the body such as an eye, an eyebrow, a nose or a mouth may be generated and used for the template matching.

It is possible to use the human body detection apparatus 1, 1B or 1C according to the present invention for detecting objects other than a human body. For example, a body of an animal, a car or a motor bike can be detected.

It is possible to store the template TP in a recording medium such as an MO, a CD-R, a DVD-ROM, a hard disk or a flexible disk, so that the template TP can be used in other human body detection apparatus 1.

A structure of the entire or a part of the monitoring system 100, a human body detection apparatus 1 and a video camera 2, the method for detecting the human body, content or order of the process can be modified if necessary within the scope of the present invention.

The present invention can be used for calculating the number of passersby who pass a predetermined position more precisely, or for detecting the head (a face) of the passerby more precisely and in shorter time so as to display as an enlarged image, or for storing an image of the head (a face image). Thus, the present invention can be used especially for controlling security of a facility.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An object detection apparatus for detecting a target object in an image, comprising:
    a template memory portion for memorizing a template consisting of one or more open curves indicating a part of a contour of a model of the object or a part of the model;
    an image input portion for entering an image to be detected;
    a detection portion for detecting the object in the entered image by calculating a matching degree of the entered image with the template;
    an edge image generation portion for generating an edge image of the entered image;
    an overlapping portion for overlapping the generated edge image with the template; and
    a count portion for counting the number of times of overlapping of the template with the one or more open curves for each pixel in the edge image when the overlapping portion performed the overlapping process for each pixel on an edge of the edge image, wherein
    the template memory portion has a template that is made of one or more open curves indicating a part of a contour of a model of the object or a part of the model and a point indicating a predetermined position of the model, and is made by rotating the one or more open curves around the point by a half-turn,
    the overlapping portion overlaps the edge image with the template so that a pixel on the edge of the edge image matches the point of the template, and
    the detection portion detects the object by calculating the matching degree in accordance with the number of times counted by the count portion.

2. The object detection apparatus according to claim 1, wherein
    the object is a person, and
    the open curve constituting the template is a contour of an upper half of a human head.

3. The object detection apparatus according to claim 1, wherein
    the object is a person, and
    the open curves constituting the template are contours of human shoulders.

4. An object detection apparatus for detecting a target object in an image, comprising:
    a template memory portion for memorizing a template consisting of one or more open curves indicating a part of a contour of a model of the object or a part of the model;
    an image input portion for entering an image to be detected;
    a detection portion for detecting the object in the entered image by calculating a matching degree of the entered image with the template;
    a brightness image generation portion for generating a brightness image of the entered image; and
    an average brightness calculation portion for calculating an average brightness of an image area of the generated brightness image, wherein
    the template memory portion memorizes a template consisting of one or more open curves indicating a part of a contour of a model of the object or a part of the model and a plurality of areas sandwiching the one or more open curves,
    the average brightness calculation portion calculates an average brightness of each image area of the brightness image overlapping the plural areas of the template when overlapping the template with each position of the generated brightness image, and
    the detection portion detects the object by calculating the matching degree in accordance with the average brightness of each of the image areas of the brightness image that was calculated by the average brightness calculation portion.

5. The object detection apparatus according to claim 4, wherein
    the object is a person, and
    the open curve constituting the template is a contour of an upper half of a human head.

6. The object detection apparatus according to claim 4, wherein
    the object is a person, and
    the open curves constituting the template are contours of human shoulders.

7. An object detection method for detecting a target object in an image, comprising:
    a step for entering an image to be detected;
    a step for detecting the object in the entered image by calculating a matching degree of the entered image with a template consisting of one or more open curves indicating a part of a contour of a model of the object or a part of the model;
    a step for generating an edge image of the entered image;
    a step for overlapping the generated edge image with the template; and
    a step for counting the number of times of overlapping of the template with the one or more open curves for each pixel in the edge image when performing the overlapping process for each pixel on an edge of the edge image, wherein
    the template is a template that is made of one or more open curves indicating a part of a contour of a model of the object or a part of the model and a point indicating a predetermined position of the model, and is made by rotating the one or more open curves around the point by a half-turn, the step for overlapping includes overlapping the edge image with the template so that a pixel on the edge of the edge image matches the point of the template, and the step for detecting includes detecting the object by calculating the matching degree in accordance with the number of times counted in the step for counting.

8. The object detection method according to claim 7, wherein the object is a person, and the open curve constituting the template is a contour of an upper half of a human head.

9. The object detection method according to claim 7, wherein the object is a person, and the open curves constituting the template are contours of human shoulders.

10. An object detection method for detecting a target object in an image, comprising:

a step for entering an image to be detected;

a step for detecting the object in the entered image by calculating a matching degree of the entered image with a template consisting of one or more open curves indicating a part of a contour of a model of the object or a part of the model;

a step for generating a brightness image of the entered image; and a step for calculating an average brightness in an image area of the generated brightness image, wherein the template is a template that is made of one or more open curves indicating a part of a contour of a model of the object or a part of the model and a plurality of areas sandwiching the one or more open curves, the step for calculating an average brightness includes calculating an average brightness of each image area of the brightness image overlapping the plural areas of the template when overlapping the template with each position of the generated brightness image, and the step for detecting includes detecting the object by calculating the matching degree in accordance with the calculated average brightness of each of the image areas of the brightness image.

11. The object detection method according to claim 10, wherein the object is a person, and the open curve constituting the template is a contour of an upper half of a human head.

12. The object detection method according to claim 10, wherein the object is a person, and the open curves constituting the template are contours of human shoulders.

13. A monitoring system, comprising:

a video camera for taking an image; and an object detection apparatus for detecting a target object in the image taken by the video camera, wherein the object detection apparatus includes:

a template memory portion for memorizing a template consisting one or more open curves indicating a part of a contour of a model of the object or a part of the model, and a detection portion for detecting the object in the image by calculating a matching degree of the image taken by the video camera with the template;

an edge image generation portion for generating an edge image of the image;

an overlapping portion for overlapping the generated edge image with the template; and a count portion for counting the number of times of overlapping of the template with the one or more open curves for each pixel in the edge image when the overlapping portion performed the overlapping process for each pixel on an edge of the edge image, wherein the template memory portion has a template that is made of one or more open curves indicating a part of a contour of a model of the object or a part of the model and a point indicating a predetermined position of the model, and is made by rotating the one or more open curves around the point by a half-turn, the overlapping portion overlaps the edge image with the template so that a pixel on the edge of the edge image matches the point of the template, and the detection portion detects the object by calculating the matching degree in accordance with the number of times counted by the count portion.

14. The monitoring system according to claim 13, further comprising:

an image display device for displaying an enlarged image area of the object detected by the object detection apparatus among the image taken by the video camera.

15. The monitoring system according to claim 13, further comprising:

a recording device for recording an image taken by the video camera when the object is detected in the image.

16. The monitoring system according to claim 13, wherein the object is a person, and the open curve constituting the template is a contour of an upper half of a human head.

17. The monitoring system according to claim 13, wherein the object is a person, and the open curves constituting the template are contours of human shoulders.

* * * * *